US012755581B2

(12) United States Patent
Tasaki et al.

(10) Patent No.: US 12,755,581 B2
(45) Date of Patent: Oct. 6, 2026

(54) INFORMATION PROCESSING METHOD, INFORMATION PROCESSING DEVICE AND NON-TRANSITORY COMPUTER READABLE RECORDING MEDIUM STORING INFORMATION PROCESSING PROGRAM

(71) Applicant: Panasonic Intellectual Property Corporation of America, Torrance, CA (US)

(72) Inventors: Nobuaki Tasaki, Osaka (JP); Atsuyoshi Kita, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/966,694

(22) Filed: Dec. 3, 2024

(65) Prior Publication Data

US 2025/0095407 A1 Mar. 20, 2025

Related U.S. Application Data

(63) Continuation of application No. PCT/JP2023/019984, filed on May 29, 2023.

(30) Foreign Application Priority Data

Jun. 8, 2022 (JP) ................................. 2022-093131

(51) Int. Cl.

*G01C 21/34* (2006.01)
*B60L 58/12* (2019.01)

(Continued)

(52) U.S. Cl.

CPC .............. *G07C 5/004* (2013.01); *B60L 58/12* (2019.02); *G01C 21/3469* (2013.01); *G01C 21/367* (2013.01); *G06T 11/10* (2026.01)

(58) Field of Classification Search

CPC ..... G07C 5/004; B60L 58/12; B60L 2250/16; B60L 15/20; B60L 50/60; G01C 21/3469;

(Continued)

(56) References Cited

U.S. PATENT DOCUMENTS

| | | | | |
|---|---|---|---|---|
| 8,880,337 B2 * | 11/2014 | Scholl | ................ | G01C 21/3867 701/426 |
| 2014/0163854 A1 * | 6/2014 | Matsumoto | ........... | B60L 53/665 701/123 |
| 2019/0178661 A1 | 6/2019 | Sakaida et al. | | |

FOREIGN PATENT DOCUMENTS

| | | | |
|---|---|---|---|
| EP | 2690408 A1 * | 1/2014 | ......... G01C 21/3469 |
| JP | 2011217509 A * | 10/2011 | |

(Continued)

OTHER PUBLICATIONS

Machine translation of JP2011217509A.*

(Continued)

*Primary Examiner* — Robert T Nguyen

(74) *Attorney, Agent, or Firm* — Wenderoth, Lind & Ponack, L.L.P.

(57) ABSTRACT

A server acquires a departure point of an electric vehicle and current remaining power amount of a battery included in the electric vehicle, estimates a power consumption amount in a case where the electric vehicle moves from the departure point to each of a plurality of mesh regions obtained by dividing a map, calculates a remaining power amount after movement in a case where the electric vehicle moves from the departure point to each of the plurality of mesh regions based on the current remaining power amount and the power consumption amount, generates an image in which a color or brightness in a drawing region formed by connecting representative points of four of the mesh regions is changed gradually according to the remaining power amount after (Continued)

movement, and outputs information obtained by superimposing the generated image on the map.

11 Claims, 15 Drawing Sheets

(51) Int. Cl.

*G01C 21/36* (2006.01)
*G06T 11/10* (2026.01)
*G07C 5/00* (2006.01)

(58) Field of Classification Search

CPC .............. G01C 21/367; G01C 21/3697; G01C 21/3881; G06T 11/10; G09B 29/00; G16Y 10/40; G16Y 20/20; G16Y 20/30

See application file for complete search history.

(56) References Cited

FOREIGN PATENT DOCUMENTS

| | | | | | |
|---|---|---|---|---|---|
| JP | 5544983 | | | 7/2014 | |
| JP | 5916862 | | | 5/2016 | |
| JP | 6325583 | B2 | * | 5/2018 | |
| JP | 2019-105517 | | | 6/2019 | |
| JP | 2022151264 | A | * | 10/2022 | |
| WO | WO-2014068685 | A1 | * | 5/2014 | ......... G01C 21/3697 |

OTHER PUBLICATIONS

Machine translation of JP6325583B2.*
Machine translation of JP-2022151264-A.*
Machine translation of WO-2014068685-A1.*
International Search Report issued Aug. 8, 2023 in corresponding International Application No. PCT/JP2023/019984.

* cited by examiner

FIG.3

| VEHICLE ID | FIRST MOVING DISTANCE RANGE | SECOND MOVING DISTANCE RANGE | THIRD MOVING DISTANCE RANGE |
|---|---|---|---|
| 0001 | +0.5% | +0.4% | +0.3% |
| 0002 | −2.0% | −1.6% | −1.2% |
| 0003 | +1.2% | +0.9% | +0.6% |
| 0004 | −1.4% | −1.2% | −1.1% |
| ... | ... | ... | ... |

INFORMATION PROCESSING METHOD, INFORMATION PROCESSING DEVICE AND NON-TRANSITORY COMPUTER READABLE RECORDING MEDIUM STORING INFORMATION PROCESSING PROGRAM

FIELD OF INVENTION

The present disclosure relates to a technique for presenting a travelable range of an electric moving body.

BACKGROUND ART

For example, an image processing device of Patent Literature 1 selects and deletes a region unnecessary for display from a reachable range divided into a plurality of parts, and displays only a predetermined number of regions having a predetermined area, perimeter, and shape.

Further, for example, a display device of Patent Literature 2 acquires a position of a host vehicle and remaining capacity of a battery mounted on the host vehicle at a predetermined timing, refers to readable map information in which a predetermined mesh is defined, sequentially sets target meshes to be processed with reference to the position of the host vehicle, calculates a power consumption level of the set target mesh based on power consumption information affecting power consumption required for traveling a mesh acquired from the inside and/or the outside of the host vehicle, determines whether or not the host vehicle can travel the target mesh based on the calculated power consumption level of the target mesh and remaining capacity of the battery of the host vehicle or a travelable distance according to the battery remaining capacity, and displays a target mesh determined to be travelable by the host vehicle as a travelable range.

However, in the above-described conventional technique, it has been difficult to display a travelable range of an electric moving body in detail, and further improvement has been required.

Patent Literature 1: JP 5916862 B2

Patent Literature 2: JP 5544983 B2

SUMMARY OF THE INVENTION

The present disclosure has been made to solve the above problem, and an object of the present disclosure is to provide a technique capable of displaying a travelable range of an electric moving body in detail.

An information processing method according to the present disclosure is an information processing method by a computer, the information processing method including acquiring a departure point of an electric moving body and a current remaining power amount of a battery included in the electric moving body, estimating a power consumption amount in a case where the electric moving body moves from the departure point to each of a plurality of mesh regions obtained by dividing a map, calculating a remaining power amount after movement in a case where the electric moving body moves from the departure point to each of the plurality of mesh regions based on the current remaining power amount and the power consumption amount, identifying a plurality of mesh regions in which the remaining power amount after movement is equal to or more than a threshold as a plurality of reachable mesh regions, generating a gradation image in which a color or brightness in a drawing region formed by connecting center points of four reachable mesh regions among the plurality of reachable mesh regions is changed gradually according to the remaining power amount after movement, generating the gradation image for all of the plurality of reachable mesh regions, and outputting information obtained by superimposing the generated gradation image on a map.

According to the present disclosure, it is possible to display a travelable range of an electric moving body in detail.

BRIEF DESCRIPTION OF THE DRAWINGS

FIG. 3 is a diagram illustrating an example of correction factor information stored in a correction factor storage part in the first embodiment.

DETAILED DESCRIPTION

Knowledge Underlying Present Disclosure

Figure 1:
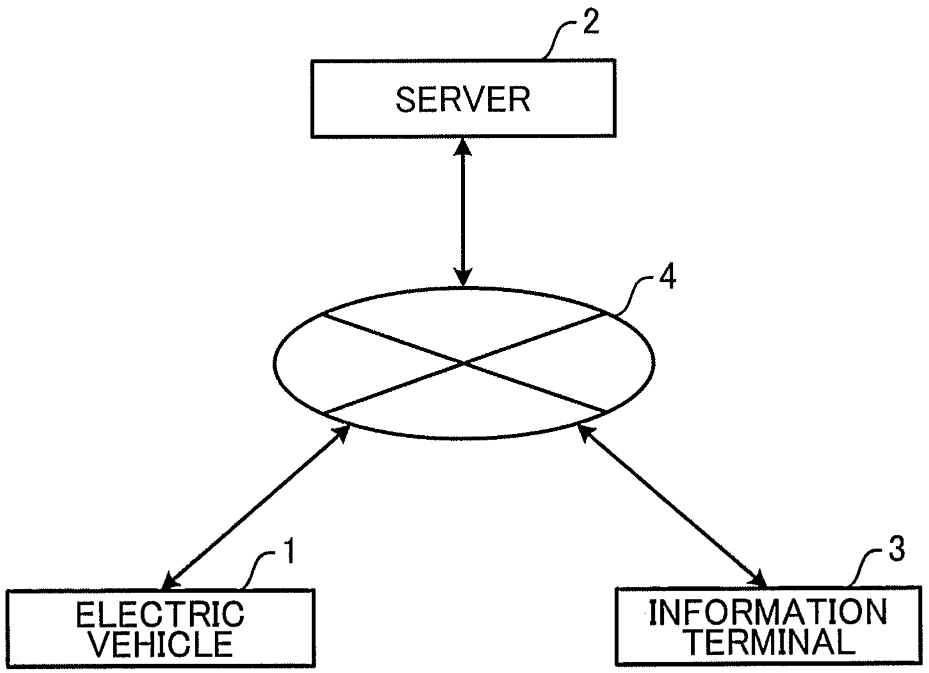
FIG. 1 is a diagram illustrating an overall configuration of a travelable range presentation system in a first embodiment of the present disclosure.

In Patent Literature 1, map information is divided into a plurality of regions, whether or not a moving body is reachable is searched for in each region, identification information for identifying that the moving body is reachable or unreachable is assigned to each region, and a reachable range of the moving body is generated based on a region to which identification information indicating reachable is assigned. In this case, since whether or not a moving body is reachable is searched for each region, a reachable range of the moving body is only roughly presented. For example, there may be a case where it is travelable or not is greatly changed although it is not hardly changed in terms of distance at a boundary between adjacent meshes.

Further, in Patent Literature 2, a mesh determined to be travelable based on a power consumption level of each mesh is displayed as a travelable range. In this case, since a travelable range is shown in units of meshes, a travelable range of a vehicle is only roughly presented.

In order to solve the above problem, a technique below is disclosed.

(1) An information processing method according to one aspect of the present disclosure is an information processing method by a computer, the information processing method including acquiring a departure point of an electric moving body and a current remaining power amount of a battery included in the electric moving body, estimating a power consumption amount in a case where the electric moving body moves from the departure point to each of a plurality of mesh regions obtained by dividing a map, calculating a remaining power amount after movement in a case where the electric moving body moves from the departure point to each of the plurality of mesh regions based on the current remaining power amount and the power consumption amount, generating an image in which a color or brightness in a drawing region formed by connecting representative points of four of the mesh regions is changed gradually according to the remaining power amount after movement, and outputting information obtained by superimposing the generated image on a map.

According to this configuration, an image in which a color or brightness in a drawing region formed by connecting representative points of four mesh regions is changed gradually according to a remaining power amount after movement is generated, and information obtained by superimposing the generated image on a map is output.

Therefore, since a range in which an electric moving body can travel is represented by an image in which a color or brightness changes gradually according to a remaining power amount after movement of a battery of the electric moving body, a travelable range of an electric moving body can be displayed in detail.

(2) The information processing method according to (1) above may further include identifying, as a plurality of reachable mesh regions, a plurality of mesh regions in which the remaining power amount after movement is equal to or more than a threshold, and in the generating an image, a gradation image in which a color or brightness in a drawing region formed by connecting center points of four reachable mesh regions among the plurality of reachable mesh regions is changed gradually according to the remaining power amount after movement may be generated, the gradation image may be generated for all of the plurality of reachable mesh regions, and in the outputting information, information obtained by superimposing the generated gradation image on a map may be output.

According to this configuration, a plurality of mesh regions in which a remaining power amount after movement is equal to or more than a threshold is identified as a plurality of reachable mesh regions. A gradation image in which a color or brightness in a drawing region formed by connecting center points of four reachable mesh regions among a plurality of reachable mesh regions is changed gradually according to a remaining power amount after movement is generated. A gradation image is generated for all of a plurality of reachable mesh regions. Information obtained by superimposing the generated gradation image on a map is output.

Therefore, since a range in which an electric moving body can travel is represented by gradation in which a color or brightness changes gradually according to a remaining power amount after movement of a battery of the electric moving body, a travelable range of an electric moving body can be displayed in detail.

(3) In the information processing method according to (2) above, in the generating an image, the gradation image in which a color or brightness in a drawing region formed by connecting a center point of one reachable mesh region among the plurality of reachable mesh regions and three center points of three reachable mesh regions around the one reachable mesh region is changed gradually according to the remaining power amounts after movement in the one reachable mesh region and the three reachable mesh regions may be generated.

According to this configuration, a gradation image in which a color or brightness in a drawing region formed by connecting a center point of one reachable mesh region among a plurality of reachable mesh regions and three center points of three reachable mesh regions around the one reachable mesh region is changed gradually according to a remaining power amount after movement in the one reachable mesh region and the three reachable mesh regions is generated.

Therefore, a gradation image can be generated with reference to a center point of one reachable mesh region among a plurality of reachable mesh regions.

(4) In the information processing method according to any one of (1) to (3) above, in the estimating a power consumption amount, the power consumption amount may be read out, for each of the plurality of mesh regions, from a power consumption amount storage part that stores in advance a power consumption amount in a case where the electric moving body moves between the plurality of mesh regions.

According to this configuration, a power consumption amount in a case where an electric moving body moves between a plurality of mesh regions is stored in advance in the power consumption amount storage part. Then, when a power consumption amount is estimated for each of a plurality of mesh regions, the power consumption amount is not calculated by arithmetic processing, but is read out from the power consumption amount storage part. Therefore, arithmetic processing for calculating a power consumption amount is unnecessary, and a travelable range of an electric moving body can be displayed at high speed.

(5) The information processing method according to (4) above may further include searching for a moving route from a mesh region as a start point to a mesh region as an end point among the plurality of mesh regions, estimating a power consumption amount when the electric moving body moves between the mesh regions by inputting a moving distance of the searched moving route to a power consumption amount estimation model generated by machine learning with a moving distance as an input value and a power consumption amount as an output value, and storing, in the power consumption amount storage part, the estimated power consumption amount, the mesh region as a start point, and the mesh region as an end point in association with each other.

According to this configuration, a moving distance of a searched moving route is input to a power consumption amount estimation model, so that a power consumption amount when an electric moving body moves between mesh regions is estimated. Therefore, a power consumption amount when an electric moving body moves between mesh regions can be easily estimated using a power consumption amount estimation model generated in advance by machine learning.

(6) The information processing method according to any one of (1) to (5) above may further include reading out a correction factor associated with a moving distance and moving body identification information for identifying a plurality of electric moving bodies from a correction factor storage part that stores in advance the correction factor, and correcting the power consumption amount by using the read correction factor, and the correction factor may be a value obtained by dividing a power consumption amount when the electric moving body identified by the moving body identification information moves a predetermined moving distance by an average of power consumption amounts when a plurality of electric moving bodies of the same vehicle type move the same moving distance as the predetermined moving distance.

According to this configuration, a power consumption amount estimated according to a vehicle type of an electric moving body can be corrected to a power consumption amount according to an electric moving body identified by moving body identification information, and a power consumption amount can be estimated more accurately.

(7) In the information processing method according to any one of (1) to (6) above, in the estimating a power consumption amount, the power consumption amount in a case where the electric moving body moves from a representative point included in a mesh region where the departure point is located to a representative point included in each of the plurality of mesh regions may be estimated for each of the plurality of mesh regions.

According to this configuration, it is easy to estimate a power consumption amount by storing in advance a power consumption amount in a case where an electric moving body moves between representative points included in a plurality of mesh regions.

(8) In the information processing method according to (7) above, the representative point may be a node on a map closest to a center point of the mesh region.

According to this configuration, since a representative point is a node on a map closest to a center point of a mesh region, a moving route between representative points can be easily searched for.

(9) In the information processing method according to (2) above, the drawing region may have a rectangular shape, and in the generating an image, the gradation image in which a color or brightness in a drawing region formed by connecting a center point of a first reachable mesh region among the plurality of reachable mesh regions, a center point of a second reachable mesh region on a left side of the first reachable mesh region, a center point of a third reachable mesh region on an upper left side of the first reachable mesh region, and a center point of a fourth reachable mesh region on an upper side of the first reachable mesh region is changed gradually according to the remaining power amount after movement in the first reachable mesh region, the second reachable mesh region, the third reachable mesh region, and the fourth reachable mesh region may be generated.

According to this configuration, the inside of a rectangular drawing region formed by connecting a center point of the first reachable mesh region, a center point of the second reachable mesh region, a center point of the third reachable mesh region, and a center point of the fourth reachable mesh region is represented by gradation in which a color or brightness is changed gradually. Therefore, by combining a plurality of drawing regions, the entirety of a plurality of mesh regions on a map can be covered with a gradation image.

(10) In the information processing method according to any one of (1) to (9) above, in the estimating a power consumption amount, four departure representative points around the departure point may be identified among representative points included in each of the plurality of mesh regions, the plurality of mesh regions may be divided into four blocks including each of the four departure representative points, a first power consumption amount when moving from the departure representative point to a representative point of each of a plurality of mesh regions in a same block may be estimated for each of the plurality of mesh regions, a moving route from the departure point to the departure representative point may be searched for, a second power consumption amount when the electric moving body moves along the searched moving route may be estimated, a total power consumption amount obtained by combining the estimated first power consumption amount and the estimated second power consumption amount may be calculated, and the total power consumption amount may be calculated in each of the four blocks, and in the calculating a remaining power amount after movement, a remaining power amount after movement in a case where the electric moving body moves from the departure point to each of the plurality of mesh regions may be calculated for each of the plurality of mesh regions based on the acquired current remaining power amount and a plurality of calculated total power consumption amounts.

According to this configuration, a total power consumption amount obtained by combining a first power consumption amount when an electric moving body moves from a departure representative point to a representative point of each of a plurality of mesh regions in the same block and a second power consumption amount when an electric moving body moves along a moving route from a departure point to a departure representative point is calculated. Therefore, it is possible to more accurately calculate a remaining power amount after movement in a case where an electric moving body moves from a departure point to each of a plurality of mesh regions.

Further, the present disclosure can be implemented not only as an information processing method for executing the characteristic processing as described above, but also as an information processing device or the like having a characteristic configuration corresponding to characteristic processing executed by the information processing method. Further, the present disclosure can also be implemented as a computer program that causes a computer to execute characteristic processing included in the information processing method described above. Therefore, even in another aspect below can achieve an effect as in the above information processing method.

(11) An information processing device according to another aspect of the present disclosure includes an acquisition part that acquires a departure point of an electric moving body and a current remaining power amount of a battery included in the electric moving body, an estimation part that estimates a power consumption amount in a case where the electric moving body moves from the departure point to each of a plurality of mesh regions obtained by dividing a map, a calculation part that calculates a remaining power amount after movement in a case where the electric moving body moves from the departure point to each of the plurality of mesh regions based on the current remaining power amount and the power consumption amount, a generation part that generates an image in which a color or brightness in a drawing region formed by connecting representative points of four of the mesh regions is changed gradually according to the remaining power amount after movement, and an output part that outputs information obtained by superimposing the generated image on a map.

(12) An information processing program according to another aspect of the present disclosure causes a computer to function to acquire a departure point of an electric moving body and a current remaining power amount of a battery included in the electric moving body, estimate a power consumption amount in a case where the electric moving body moves from the departure point to each of a plurality of mesh regions obtained by dividing a map, calculate a remaining power amount after movement in a case where the electric moving body moves from the departure point to each of the plurality of mesh regions based on the current remaining power amount and the power consumption amount, generate an image in which a color or brightness in a drawing region formed by connecting representative points of four of the mesh regions is changed gradually according to the remaining power amount after movement, and output information obtained by superimposing the generated image on a map.

(13) A non-transitory computer-readable recording medium according to another aspect of the present disclosure records an information processing program, and the information processing program causes a computer to function to acquire a departure point of an electric moving body and a current remaining power amount of a battery included in the electric moving body, estimate a power consumption amount in a case where the electric moving body moves from the departure point to each of a plurality of mesh regions obtained by dividing a map, calculate a remaining power amount after movement in a case where the electric moving body moves from the departure point to each of the plurality of mesh regions based on the current remaining power amount and the power consumption amount, generate an image in which a color or brightness in a drawing region formed by connecting representative points of four of the mesh regions is changed gradually according to the remaining power amount after movement, and output information obtained by superimposing the generated image on a map.

An embodiment of the present disclosure will be described below with reference to the accompanying drawings. Note that the embodiment below is an example of an embodiment of the present disclosure, and is not intended to limit the technical scope of the present disclosure.

First Embodiment

FIG. 1 is a diagram illustrating an overall configuration of a travelable range presentation system in a first embodiment of the present disclosure.

The travelable range presentation system illustrated in FIG. 1 includes an electric vehicle 1, a server 2, and an information terminal 3.

The electric vehicle 1 is an example of an electric moving body that moves using a mounted battery. The battery is a chargeable and dischargeable secondary battery. The electric vehicle 1 is, for example, an electric car, an electric truck, an electric bus, or an electric motorcycle, and moves by supplying electric power with which a battery is charged to an electric motor. The electric vehicle 1 is communicably connected to the server 2 via a network 4. The electric vehicle 1 periodically transmits, to the server 2, a vehicle ID for identifying the electric vehicle 1, a current position of the electric vehicle 1, and a current remaining power amount (remaining capacity) of a battery included in the electric vehicle 1. The electric vehicle 1 includes a global positioning system (GPS) receiver that acquires position information indicating a current position of the electric vehicle 1. Further, the electric vehicle 1 periodically transmits, to the server 2, a vehicle ID, a moving distance of a moving route along which the electric vehicle 1 moves, and a power consumption amount when the electric vehicle 1 moves along the moving route.

Note that the electric vehicle 1 may further transmit, to the server 2, an elevation difference of a moving route along which the electric vehicle 1 moves and/or weight of a load when the electric vehicle 1 moves along the moving route. The elevation difference of a moving route is, for example, a cumulative elevation in a moving route. The cumulative elevation indicates a total value of elevation differences in upward or downward directions on a moving route.

Further, the travelable range presentation system includes not only one of the electric vehicle 1 but also a plurality of the electric vehicles 1.

The information terminal 3 is, for example, a personal computer, a smartphone, a tablet computer, an in-vehicle terminal, or the like, and is operated by the user who uses the electric vehicle 1. The information terminal 3 is communicably connected to the server 2 via the network 4. The information terminal 3 transmits, to the server 2, request information for acquiring travelable range information indicating a travelable range of the electric vehicle 1. The request information includes a vehicle ID of the electric vehicle 1. Further, the information terminal 3 receives travelable range information of the electric vehicle 1 transmitted by the server 2. The information terminal 3 displays received travelable range information.

The server 2 is a Web server, for example. The server 2 is an example of an information processing device.

Figure 2:
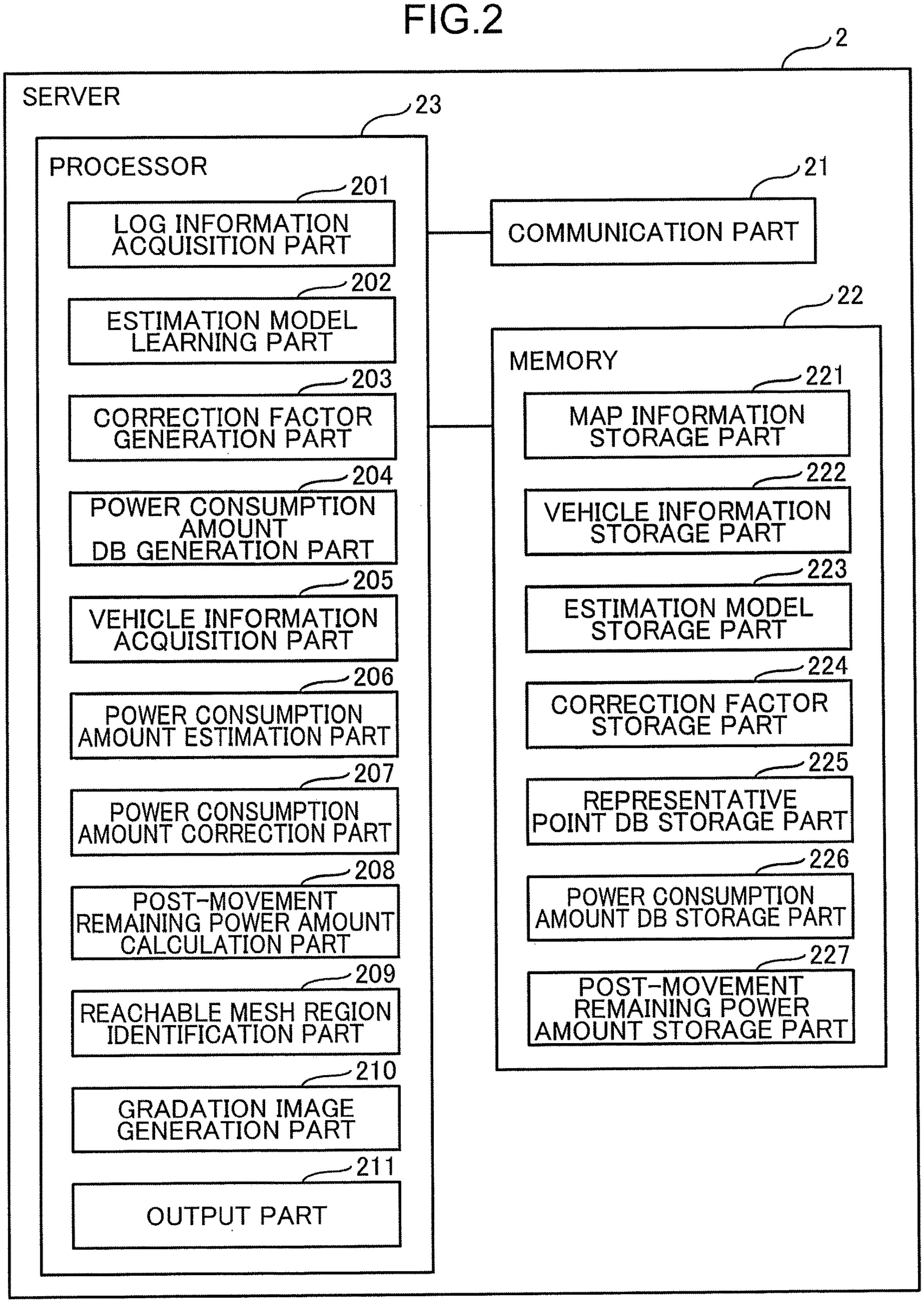
FIG. 2 is a diagram illustrating an example of a configuration of a server in the first embodiment of the present disclosure.

FIG. 2 is a diagram illustrating an example of a configuration of the server 2 in the first embodiment of the present disclosure.

The server 2 illustrated in FIG. 2 includes a communication part 21, a memory 22, and a processor 23.

The communication part 21 periodically receives a current position and a current remaining power amount transmitted by the electric vehicle 1. The communication part 21 stores the received current position and current remaining power amount in a vehicle information storage part 222 in association with a vehicle ID. Further, the communication part 21 periodically receives, from the electric vehicle 1, a vehicle ID, the moving distance of a moving route along which the electric vehicle 1 moves, and a power consumption amount when the electric vehicle 1 moves along the moving route. The communication part 21 stores the received moving distance and power consumption amount in the vehicle information storage part 222 in association with the vehicle ID.

Note that the communication part 21 may further receive, from the electric vehicle 1, an elevation difference of a moving route along which the electric vehicle 1 moves and/or weight of a load when the electric vehicle 1 moves along the moving route. The communication part 21 may further store the received elevation difference and/or weight of a load in the vehicle information storage part 222 in association with the vehicle ID.

Further, the communication part 21 receives request information transmitted by the information terminal 3. The request information includes a vehicle ID of the electric vehicle 1. Further, the communication part 21 transmits, to the information terminal 3, travelable range information indicating a travelable range of the electric vehicle 1.

The memory 22 is a storage device that can store various types of information, such as a random access memory (RAM), a hard disk drive (HDD), a solid state drive (SSD), or a flash memory. The memory 22 realizes a map information storage part 221, the vehicle information storage part 222, an estimation model storage part 223, a correction factor storage part 224, a representative point database (DB) storage part 225, a power consumption amount DB storage part 226, and a post-movement remaining power amount storage part 227.

The processor 23 is, for example, a central processing unit (CPU). The processor 23 realizes a log information acquisition part 201, an estimation model learning part 202, a correction factor generation part 203, a power consumption amount DB generation part 204, a vehicle information acquisition part 205, a power consumption amount estimation part 206, a power consumption amount correction part 207, a post-movement remaining power amount calculation part 208, a reachable mesh region identification part 209, a gradation image generation part 210, and an output part 211.

Note that the log information acquisition part 201 to the output part 211 and the map information storage part 221 to the post-movement remaining power amount storage part 227 may be configured by a dedicated hardware circuit. Further, the log information acquisition part 201 to the output part 211 and the map information storage part 221 to the post-movement remaining power amount storage part 227 may be dispersedly arranged in a plurality of devices.

The map information storage part 221 stores in advance map information indicating a map divided into a plurality of mesh regions. The mesh region has a rectangular shape, for example, a square shape. Length of one side of a mesh region is, for example, the same as length (about 200 meters) of one side of a zoom level 16.

The vehicle information storage part 222 stores vehicle information in which a vehicle ID, a vehicle type, a current position of the electric vehicle 1, a current remaining power amount of the electric vehicle 1, and log information of the electric vehicle 1 are associated with each other. The log information includes a plurality of combinations of a moving distance and a power consumption amount. Note that the log information may further include an elevation difference of a moving route and/or weight of a load of the electric vehicle 1. Further, the log information may include information other than a moving distance, a power consumption amount, an elevation difference, and weight of a load.

The estimation model storage part 223 stores a power consumption amount estimation model generated by machine learning with a moving distance as an input value and a power consumption amount as an output value.

The log information acquisition part 201 acquires a moving distance and a power consumption amount from the vehicle information storage part 222 when machine learning of a power consumption amount estimation model is performed.

The estimation model learning part 202 performs machine learning of a power consumption amount estimation model with a moving distance as an input value and a power consumption amount corresponding to the moving distance as an output value. Note that machine learning such as deep learning using a multilayer neural network is preferably used for learning for generating a power consumption amount estimation model. The estimation model learning part 202 stores a generated power consumption amount estimation model in the estimation model storage part 223.

Note that a power consumption amount estimation model is generated for each vehicle type of the electric vehicle 1. The estimation model storage part 223 stores a power consumption amount estimation model generated for each vehicle type of the electric vehicle 1. The log information acquisition part 201 acquires a plurality of combinations of a moving distance and a power consumption amount of a plurality of electric vehicles of the same vehicle type from the vehicle information storage part 222. The estimation model learning part 202 performs machine learning of a power consumption amount estimation model for each vehicle type, and generates a power consumption amount estimation model for each vehicle type.

Further, although the estimation model learning part 202 uses a moving distance as an input value of a power consumption amount estimation model, the present disclosure is not particularly limited to this. The estimation model learning part 202 may use a moving distance and at least one of an elevation difference and weight of a load as input values of a power consumption amount estimation model, and may use another geographical feature amount as an input value of a power consumption amount estimation model.

The correction factor storage part 224 stores in advance a correction factor associated with a moving distance and a vehicle ID for identifying a plurality of electric vehicles. The correction factor is used to correct, according to an individual electric vehicle, a power consumption amount estimated according to a vehicle type of an electric vehicle by the power consumption amount estimation part 206.

The correction factor generation part 203 generates a correction factor obtained by dividing a power consumption amount when an electric vehicle identified by a vehicle ID moves a predetermined moving distance by an average of power consumption amounts when a plurality of electric vehicles of the same vehicle type move the same moving distance as the predetermined moving distance. The correction factor generation part 203 generates a correction factor for each electric vehicle. Further, the correction factor generation part 203 generates a plurality of correction factors according to a moving distance. For example, the correction factor generation part 203 generates a plurality of correction factors according to a first moving distance range in which a moving distance is 0 kilometers or more and less than 50 kilometers, a second moving distance range in which a moving distance is 50 kilometers or more and less than 100 kilometers, and a third moving distance range in which a moving distance is 100 kilometers or more and less than 200 kilometers.

FIG. 3 is a diagram illustrating an example of correction factor information stored in the correction factor storage part 224 in the first embodiment.

As illustrated in FIG. 3, the correction factor storage part 224 stores, for each vehicle ID, a correction factor of the first moving distance range, a correction factor of the second moving distance range, and a correction factor of the third moving distance range. For example, a correction factor of the first moving distance range associated with a vehicle ID "0001" is +0.5%, a correction factor of the second moving distance range is +0.4%, and a correction factor of the third moving distance range is +0.3%.

Note that, in the first embodiment, the correction factor storage part 224 stores correction factors corresponding to three moving distance ranges. However, the present disclosure is not particularly limited to this, and the correction factor storage part 224 may store correction factors corresponding to four or more moving distance ranges.

Further, the correction factor storage part 224 may store a correction factor according to a plurality of combinations of a moving distance range and an elevation difference range, instead of a correction factor according to a moving distance range. For example, a first elevation difference range has an elevation difference of −50 meters or more and less than −10 meters, a second moving distance range has an elevation difference of −10 meters or more and less than −3 meters, a third moving distance range has an elevation difference of −3 meters or more and less than +3 meters, a fourth elevation difference range has an elevation difference of +3 meters or more and less than +10 meters, and a fifth elevation difference range has an elevation difference of +10 meters or more and less than +50 meters. The correction factor storage part 224 may store 15 correction factors corresponding to a combination of the first to third moving distance ranges and the first to fifth elevation difference ranges.

The representative point DB storage part 225 stores a representative point DB in which a mesh region ID for identifying a mesh region is associated with a position of a representative point in the mesh region. The representative point is a node on a map closest to a center point of a mesh region. Map information is information representing a map by using a plurality of nodes and a link connecting the nodes. The node indicates a characteristic position on a road, and is, for example, an intersection of a road, an end point of a road, or the like. The link represents a road between nodes. A node closest to a center point of a mesh region is set as a representative point.

Note that a nodes may be filtered according to a level of a road. For example, a node equal to or higher than a prefectural road may be set as a representative point. By the above, it is possible to prevent a narrow road that is not usually used from being set as a representative point. As a result, a route is searched using a representative point more convenient for the user, and a power consumption amount close to that in an actual situation of a road that may be actually used can be estimated.

The power consumption amount DB storage part 226 stores in advance a power consumption amount in a case where an electric vehicle moves between a plurality of mesh regions.

The power consumption amount DB generation part 204 searches for a moving route from a mesh region as a start point to a mesh region as an end point among a plurality of mesh regions. The power consumption amount DB generation part 204 inputs a moving distance of a searched moving route to a power consumption amount estimation model generated by machine learning with a moving distance as an input value and a power consumption amount as an output value, so as to estimate a power consumption amount when an electric vehicle moves between mesh regions. At this time, the power consumption amount DB generation part 204 reads a power consumption amount estimation model stored in the estimation model storage part 223, inputs a moving distance of the searched moving route to the power consumption amount estimation model, and acquires a power consumption amount output from the power consumption amount estimation model as an estimation result. The power consumption amount DB generation part 204 stores, in the power consumption amount DB storage part 226, an estimated power consumption amount, a mesh region as a start point, and a mesh region as an end point in association with each other.

Figure 4:
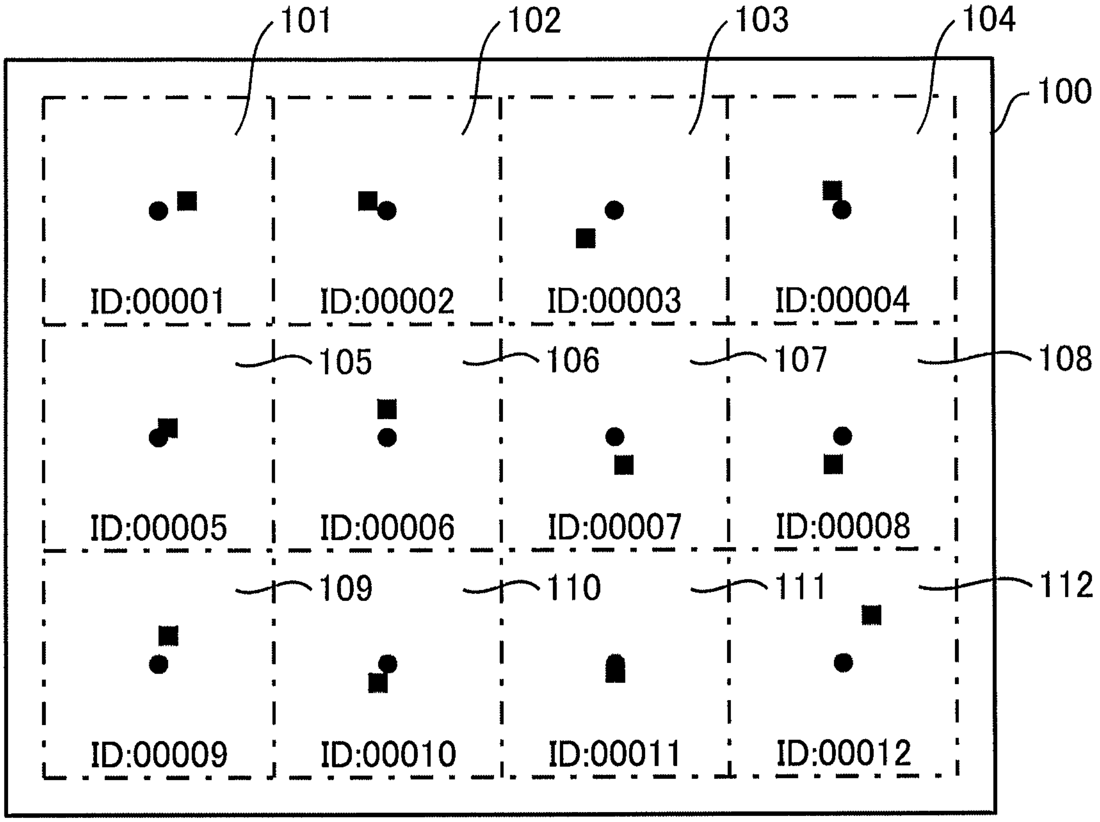
FIG. 4 is a schematic diagram for describing a relationship between a mesh region and a representative point in the first embodiment.

FIG. 4 is a schematic diagram for describing a relationship between a mesh region and a representative point in the first embodiment.

A map 100 is divided into a plurality of rectangular mesh regions 101 to 112. A mesh region ID for identifying a mesh region is assigned to each mesh region. For example, a mesh region ID of "00001" is assigned to the mesh region 101. In FIG. 4, a black circle point represents a center point (centroid point) of a mesh region, and a black square point represents a representative point. As described above, a representative point is a node closest to a center point of a mesh region. For this reason, a center point of a mesh region and a representative point do not necessarily coincide with each other.

The power consumption amount DB generation part 204 searches for a moving route from a mesh region as a start point to a mesh region as an end point among a plurality of mesh regions. For example, when the mesh region 101 is a start point, each of the mesh regions 102 to 112 is an end point. The power consumption amount DB generation part 204 searches for a moving route from the mesh region 101 as a start point to each of a plurality of the mesh regions 102 to 112 as end points. At this time, the power consumption amount DB generation part 204 searches for a moving route from a representative point of the mesh region 101 to a representative point of each of a plurality of the mesh regions 102 to 112.

Note that a moving route from a mesh region as a start point to a mesh region as an end point is calculated using a route search algorithm of a conventional technique. In the route search algorithm, a moving route with a shortest moving distance or a moving route with shortest moving time is calculated. The route search algorithm is, for example, Dijkstra's algorithm. The shortest route is, for example, a route with minimum cost. However, this is an example, and the power consumption amount DB generation part 204 may calculate a moving route by using an external map application programming interface (API) or the like.

Next, the power consumption amount DB generation part 204 calculates a moving distance of a searched moving route. Length of a moving route can be calculated by summing lengths of a plurality of links constituting a moving route. Next, the power consumption amount DB generation part 204 inputs a calculated moving distance of a moving route to a power consumption amount estimation model stored in advance, so that a power consumption amount when an electric vehicle moves between mesh regions is estimated. The power consumption amount DB generation part 204 estimates a power consumption amount for all moving routes between the mesh region 101 as a start point and a plurality of the mesh regions 102 to 112 as end points.

Next, the power consumption amount DB generation part 204 stores an estimated power consumption amount, a mesh region ID for identifying the mesh region 101 as a start point, and a mesh region ID for identifying the mesh regions 102 to 112 as end points in the power consumption amount DB storage part 226 in association with each other.

Next, the power consumption amount DB generation part 204 changes a mesh region as a start point to another mesh region. Then, the power consumption amount DB generation part 204 repeats the above processing. By the above, the power consumption amount DB generation part 204 generates a power consumption amount DB in which an estimated power consumption amount, a mesh region ID for identifying the mesh regions 101 to 112 as start points, and a mesh region ID for identifying the mesh regions 101 to 112 as end points are associated with each other.

Note that the power consumption amount DB generation part 204 may set, as a mesh region as an end point, a mesh region within a predetermined range from a representative point of a mesh region as a start point. The predetermined range may be, for example, a circle having a radius that is a maximum travel distance of an electric vehicle in a fully charged state. In this manner, by limiting the number of mesh regions as end points, a calculation amount can be reduced.

The vehicle information acquisition part 205 acquires a departure point of the electric vehicle 1 and a current remaining power amount of a battery included in the electric vehicle 1. In a case where request information is received by the communication part 21, the vehicle information acquisition part 205 acquires a departure point of the electric vehicle 1 corresponding to a vehicle ID included in the request information and a current remaining power amount of a battery included in the electric vehicle 1 from the vehicle information storage part 222. Note that the electric vehicle 1 transmits a current position and a current remaining power amount of a battery to the server 2 every minute, for example, and the vehicle information storage part 222 stores a current position of the electric vehicle 1 and a current remaining power amount of a battery received every minute. For this reason, the vehicle information acquisition part 205 acquires a latest position and a latest remaining power amount of the electric vehicle 1 stored in the vehicle information storage part 222 as a departure point and a current remaining power amount of the electric vehicle 1.

Note that in a case where request information is received by the communication part 21, the vehicle information acquisition part 205 may transmit, to the electric vehicle 1 corresponding to a vehicle ID included in the request information, request information for requesting a current position and a current remaining power amount of a battery. Upon receiving the request information, the electric vehicle 1 transmits a current position and a current remaining power amount of a battery to the server 2. The vehicle information acquisition part 205 acquires a current position and a current remaining power amount of the electric vehicle 1 received by the communication part 21 as a departure point and a current remaining power amount of the electric vehicle 1.

Further, the information terminal 3 may receive input by the user of at least one of a departure point and a current remaining power amount of the electric vehicle 1. A touch panel included in the information terminal 3 may display a map and receive input of a departure point of the electric vehicle 1 on the map. Further, the touch panel included in the information terminal 3 may receive input by the user of an address, place name, or facility name of a departure point. The touch panel included in the information terminal 3 may receive input by the user of a current remaining power amount of the electric vehicle 1. Further, the touch panel included in the information terminal 3 may display a slider bar, and receive input by the user of a current remaining power amount of the electric vehicle 1 as a position of a knob on the slider bar is moved.

The information terminal 3 may transmit, to the server 2, request information including a vehicle ID and at least one of a departure point and a current remaining power amount of the electric vehicle 1 input by the user. When request information is received by the communication part 21, the vehicle information acquisition part 205 may acquire at least one of a departure point and a current remaining power amount of the electric vehicle 1 included in the request information.

Further, a departure point of the electric vehicle 1 may be a current position of the information terminal 3 received by a GPS receiver included in the information terminal 3. The information terminal 3 may transmit, to the server 2, request information including a current position of the information terminal 3 as a departure point of the electric vehicle 1.

The power consumption amount estimation part 206 estimates a power consumption amount in a case where the electric vehicle 1 moves from a departure point of the electric vehicle 1 to each of a plurality of mesh regions obtained by dividing a map. The power consumption amount estimation part 206 estimates, for each of a plurality of the mesh regions obtained by dividing a map, a power consumption amount in a case where the electric vehicle 1 moves from a departure point of the electric vehicle 1 to each of a plurality of the mesh regions. The power consumption amount estimation part 206 reads a power consumption amount for each of a plurality of mesh regions from the power consumption amount DB storage part 226 that stores in advance a power consumption amount in a case where the electric vehicle 1 moves between the plurality of mesh regions. The power consumption amount estimation part 206 estimates, for each of a plurality of mesh regions, a power consumption amount in a case where the electric vehicle 1 moves from a representative point included in a mesh region where a departure point is located to a representative point included in each of the plurality of mesh regions.

Figure 5:
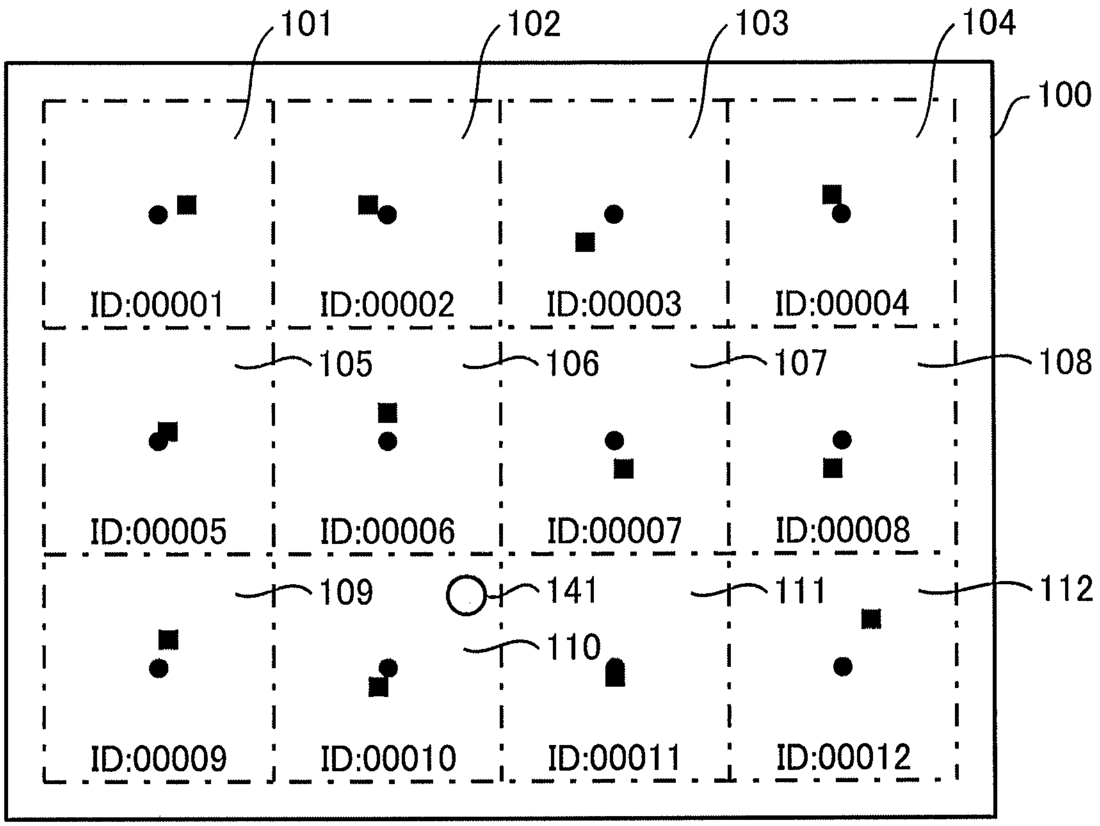
FIG. 5 is a schematic diagram for describing estimation of a power consumption amount by a power consumption amount estimation part in the first embodiment.

FIG. 5 is a schematic diagram for describing estimation of a power consumption amount by the power consumption amount estimation part 206 in the first embodiment. In FIG. 5, a black circle point represents a center point (centroid point) of a mesh region, and a black square point represents a representative point.

A departure point 141 of the electric vehicle 1 is within the mesh region 110. The power consumption amount estimation part 206 estimates, for each of a plurality of the mesh regions 101 to 109, 111, and 112, a power consumption amount in a case where the electric vehicle 1 moves from a representative point included in the mesh region 110 where the departure point 141 of the electric vehicle 1 is located to a representative point included in each of a plurality of the mesh regions 101 to 109, 111, and 112. The power consumption amount DB storage part 226 stores in advance a power consumption amount in a case where the electric vehicle 1 moves between representative points of a plurality of the mesh regions 101 to 112. For this reason, the power consumption amount estimation part 206 reads, from the power consumption amount DB storage part 226, a power consumption amount in a case where the electric vehicle 1 moves from a representative point included in the mesh region 110 where the departure point 141 of the electric vehicle 1 is located to a representative point included in each of a plurality of the mesh regions 101 to 109, 111, and 112. The power consumption amount estimation part 206 reads, from the power consumption amount DB storage part 226, a plurality of power consumption amounts associated with a mesh region ID of the mesh region 110 where the departure point 141 of the electric vehicle 1 is located and a mesh region ID of each of a plurality of the mesh regions 101 to 109, 111, and 112 other than the mesh region 110.

The power consumption amount correction part 207 reads a correction factor from the correction factor storage part 224 that stores in advance a correction factor associated with a moving distance and a vehicle ID for identifying a plurality of electric vehicles. The power consumption amount correction part 207 corrects a power consumption amount estimated for each of a plurality of mesh regions by using the read correction factor. The correction factor is a value obtained by dividing a power consumption amount when the electric vehicle 1 identified by a vehicle ID moves a predetermined moving distance by an average of power consumption amounts when a plurality of electric vehicles of the same vehicle type move the same moving distance as the predetermined moving distance.

The power consumption amount correction part 207 reads, from the correction factor storage part 224, a correction factor corresponding to a moving distance between a representative point of a mesh region including a departure point and a representative point of another mesh region. For example, in a case where a moving distance between representative points is 3 kilometers, the power consumption amount correction part 207 reads a correction factor associated with the first moving distance range of the correction factor information illustrated in FIG. 3. Note that the power consumption amount correction part 207 may read a correction factor corresponding to a moving distance and an elevation difference between representative points instead of reading a correction factor corresponding to a moving distance between representative points.

The power consumption amount correction part 207 reads, from the correction factor storage part 224, a correction factor corresponding to a moving distance between a representative point of a mesh region including a departure point and a representative point of another mesh region, and multiplies a power consumption amount between the representative points by the read correction factor so as to correct the power consumption amount. In a case where a correction factor is, for example, +0.5%, the power consumption amount correction part 207 multiplies a power consumption amount by 1.005. Further, in a case where a correction factor is, for example, −0.5%, the power consumption amount correction part 207 multiplies a power consumption amount by 0.995.

The post-movement remaining power amount calculation part 208 calculates a remaining power amount after movement in a case where the electric vehicle 1 moves from a departure point to each of a plurality of mesh regions based on a current remaining power amount acquired by the vehicle information acquisition part 205 and a power consumption amount estimated by the power consumption amount estimation part 206. The post-movement remaining power amount calculation part 208 calculates, for each of a plurality of mesh regions, a remaining power amount after movement in a case where the electric vehicle 1 moves from a departure point to each of a plurality of mesh regions based on a current remaining power amount acquired by the vehicle information acquisition part 205 and a plurality of power consumption amounts estimated by the power consumption amount estimation part 206. Note that the post-movement remaining power amount calculation part 208 calculates, for each of a plurality of mesh regions, a remaining power amount after movement in a case where the electric vehicle 1 moves from a departure point to each of a plurality of mesh regions based on a current remaining power amount acquired by the vehicle information acquisition part 205 and a plurality of power consumption amounts corrected by the power consumption amount correction part 207.

The post-movement remaining power amount calculation part 208 subtracts a power consumption amount corrected by the power consumption amount correction part 207 from a current remaining power amount acquired by the vehicle information acquisition part 205 to calculate a remaining power amount after movement in a case where the electric vehicle 1 moves from a mesh region including a departure point to another mesh region.

Note that in the first embodiment, a node is not necessarily included in a mesh region, and in a case where no node is included in a mesh region, a representative point of the mesh region is not set. The post-movement remaining power amount calculation part 208 may set a remaining power amount after movement in a case where the electric vehicle 1 moves from a mesh region including a departure point to a mesh region having no representative point to zero.

Further, in the first embodiment, the power consumption amount correction part 207 corrects a power consumption amount estimated for each of a plurality of mesh regions by using a correction factor, but the present disclosure is not particularly limited to this. The power consumption amount correction part 207 and the correction factor storage part 224 are not essential configurations, and the server 2 does not need to include the power consumption amount correction part 207 and the correction factor storage part 224.

The reachable mesh region identification part 209 identifies a plurality of mesh regions in which a remaining power amount after movement is equal to or more than a threshold as a plurality of reachable mesh regions. The reachable mesh region identification part 209 identifies, among a plurality of mesh regions, a plurality of mesh regions in which a remaining power amount after movement is equal to or more than a threshold as a plurality of reachable mesh regions. The threshold is, for example, 0 kWh.

The reachable mesh region identification part 209 stores a mesh region ID of a reachable mesh region and a remaining power amount after movement in association with each other in the post-movement remaining power amount storage part 227. For example, referring to FIG. 5, in a case where a reachable mesh region is the mesh region 101, the reachable mesh region identification part 209 stores a mesh region ID of the mesh region 101 and a remaining power amount after movement from the mesh region 110 of the departure point 141 to the mesh region 101 in association with each other in the post-movement remaining power amount storage part 227. The reachable mesh region identification part 209 also stores, for a remaining reachable mesh region, a mesh region ID of a reachable mesh region and a remaining power amount after movement in association with each other in the post-movement remaining power amount storage part 227.

The post-movement remaining power amount storage part 227 stores a remaining power amount after movement in association with a mesh region ID of a reachable mesh region.

The gradation image generation part 210 generates an image in which a color or brightness in a drawing region formed by connecting representative points of four mesh regions is changed gradually according to a remaining power amount after movement.

The gradation image generation part 210 generates a gradation image in which a color or brightness in a drawing region formed by connecting center points of four reachable mesh regions among a plurality of reachable mesh regions identified by the reachable mesh region identification part 209 is changed gradually according to a remaining power amount after movement. The gradation image generation part 210 generates a gradation image in which a color or brightness in a drawing region formed by connecting center points of four reachable mesh regions among a plurality of reachable mesh regions identified by the reachable mesh region identification part 209 is changed gradually according to a remaining power amount after movement in four reachable mesh regions. The gradation image generation part 210 generates a gradation image for all of a plurality of reachable mesh regions.

That is, the gradation image generation part 210 generates a gradation image in which a color or brightness in a drawing region formed by connecting a center point of one reachable mesh region among a plurality of reachable mesh regions identified by the reachable mesh region identification part 209 and three center points of three reachable mesh regions around the one reachable mesh region is changed gradually according to a remaining power amount after movement in the one reachable mesh region and the three reachable mesh regions.

The drawing region is rectangular. The gradation image generation part 210 generates a gradation image in which a color or brightness in a drawing region formed by connecting a center point of a first reachable mesh region among a plurality of reachable mesh regions, a center point of a second reachable mesh region on the left side of the first reachable mesh region, a center point of a third reachable mesh region on the upper left side of the first reachable mesh region, and a center point of a fourth reachable mesh region on the upper side of the first reachable mesh region is changed gradually according to a remaining power amount after movement in the first reachable mesh region, the second reachable mesh region, the third reachable mesh region, and the fourth reachable mesh region.

Figure 6:
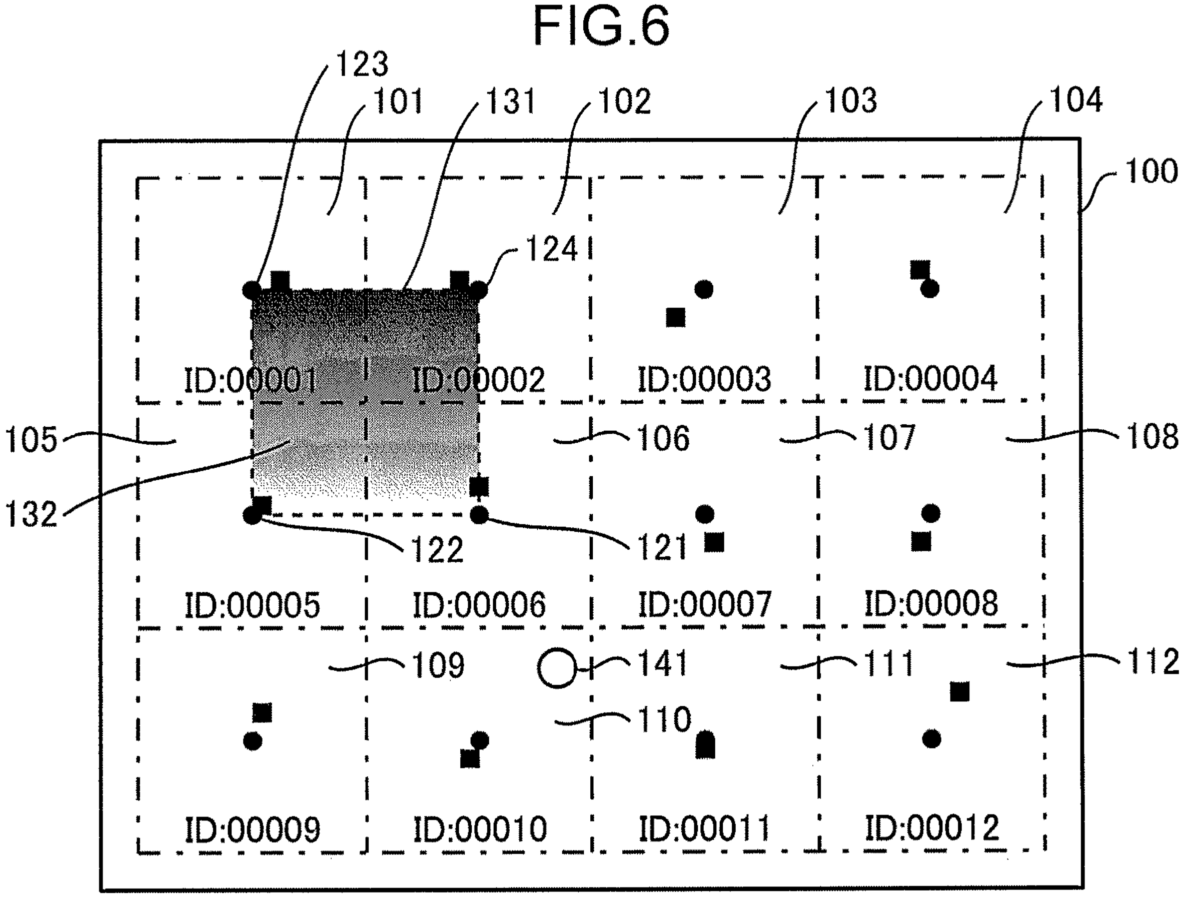
FIG. 6 is a diagram illustrating an example of one gradation image generated by a gradation image generation part in the first embodiment.

FIG. 6 is a diagram illustrating an example of one gradation image generated by the gradation image generation part 210 in the first embodiment.

In FIG. 6, the reachable mesh region identification part 209 identifies a plurality of the mesh regions 101 to 112 as a plurality of reachable mesh regions.

The gradation image generation part 210 generates a gradation image 132 in which a color or brightness in a drawing region 131 formed by connecting a center point 121 of the first reachable mesh region 106 among a plurality of the reachable mesh regions 101 to 112, a center point 122 of the second reachable mesh region 105 on the left side of the first reachable mesh region 106, a center point 123 of the third reachable mesh region 101 on the upper left side of the first reachable mesh region 106, and a center point 124 of the fourth reachable mesh region 102 on the upper side of the first reachable mesh region 106 is changed gradually according to a remaining power amount after movement in the first reachable mesh region 106, the second reachable mesh region 105, the third reachable mesh region 101, and the fourth reachable mesh region 102.

Then, the gradation image generation part 210 generates a gradation image by using each of the other reachable mesh regions 101 to 105 and 107 to 112 other than the reachable mesh region 106 as the first reachable mesh region.

Note that the gradation image generation part 210 may generate a gradation image in which a color or brightness in a drawing region formed by connecting a center point of the first reachable mesh region 106 among a plurality of the reachable mesh regions 101 to 112, a center point of the fourth reachable mesh region 102 on the upper side of the first reachable mesh region 106, a center point of the fifth reachable mesh region 103 on the upper right side of the first reachable mesh region 106, and a center point of the sixth reachable mesh region 107 on the right side of the first reachable mesh region 106 is changed gradually according to a remaining power amount after movement in the first reachable mesh region 106, the fourth reachable mesh region 102, the fifth reachable mesh region 103, and the sixth reachable mesh region 107.

Further, the gradation image generation part 210 may generate a gradation image in which a color or brightness in a drawing region formed by connecting a center point of the first reachable mesh region 106 among a plurality of the reachable mesh regions 101 to 112, a center point of the sixth reachable mesh region 107 on the right side of the first reachable mesh region 106, a center point of the seventh reachable mesh region 111 on the lower right side of the first reachable mesh region 106, and a center point of the eighth reachable mesh region 110 on the lower side of the first reachable mesh region 106 is changed gradually according to a remaining power amount after movement in the first reachable mesh region 106, the sixth reachable mesh region 107, the seventh reachable mesh region 111, and the eighth reachable mesh region 110.

Further, the gradation image generation part 210 may generate a gradation image in which a color or brightness in a drawing region formed by connecting a center point of the first reachable mesh region 106 among a plurality of the reachable mesh regions 101 to 112, a center point of the second reachable mesh region 105 on the left side of the first reachable mesh region 106, a center point of the eighth reachable mesh region 110 on the lower side of the first reachable mesh region 106, and a center point of the ninth reachable mesh region 109 on the lower left side of the first reachable mesh region 106 is changed gradually according to a remaining power amount after movement in the first reachable mesh region 106, the second reachable mesh region 105, the eighth reachable mesh region 110, and the ninth reachable mesh region 109.

The gradation image generation part 210 converts a remaining power amount after movement into travelable probability. A remaining power amount of 0 kWh after movement corresponds to travelable probability of 0%, and a power amount when the electric vehicle 1 is fully charged corresponds to travelable probability of 100%. For example, the gradation image generation part 210 sets travelable probability of 100% to green, sets travelable probability of 0% to red, and changes a color between travelable probability of 100% to 0% gradually. Then, the gradation image generation part 210 changes a color in a drawing region gradually according to a value of travelable probability of each center point.

Note that although a remaining power amount is converted into travelable probability in the first embodiment, the present disclosure is not particularly limited to this, and a charging rate may be used instead of a remaining power amount. The charging rate is a state of charge (SOC) and is expressed by (remaining capacity [Ah]/full charge capacity [Ah])*100. For example, the gradation image generation part 210 may set SOC of 100% to green, set SOC of 0% to red, and change a color between SOC of 100% to 0% gradually.

Further, a value of SOC*SOH (State OF Health) may be used instead of a remaining power amount. SOH is an index representing a deterioration state of a battery, and is expressed by (remaining capacity [Ah] at the time of deterioration/initial full charge capacity [Ah])*100. For example, the gradation image generation part 210 may set SOC*SOH of 100% to green, set SOC*SOH of 0% to red, and change a color between SOC*SOH of 100% to 0% gradually.

Further, the gradation image generation part 210 may assign a color not used for gradation or the same color as a threshold (0 kwh) to a center point of a mesh region having no representative point.

Figure 7:
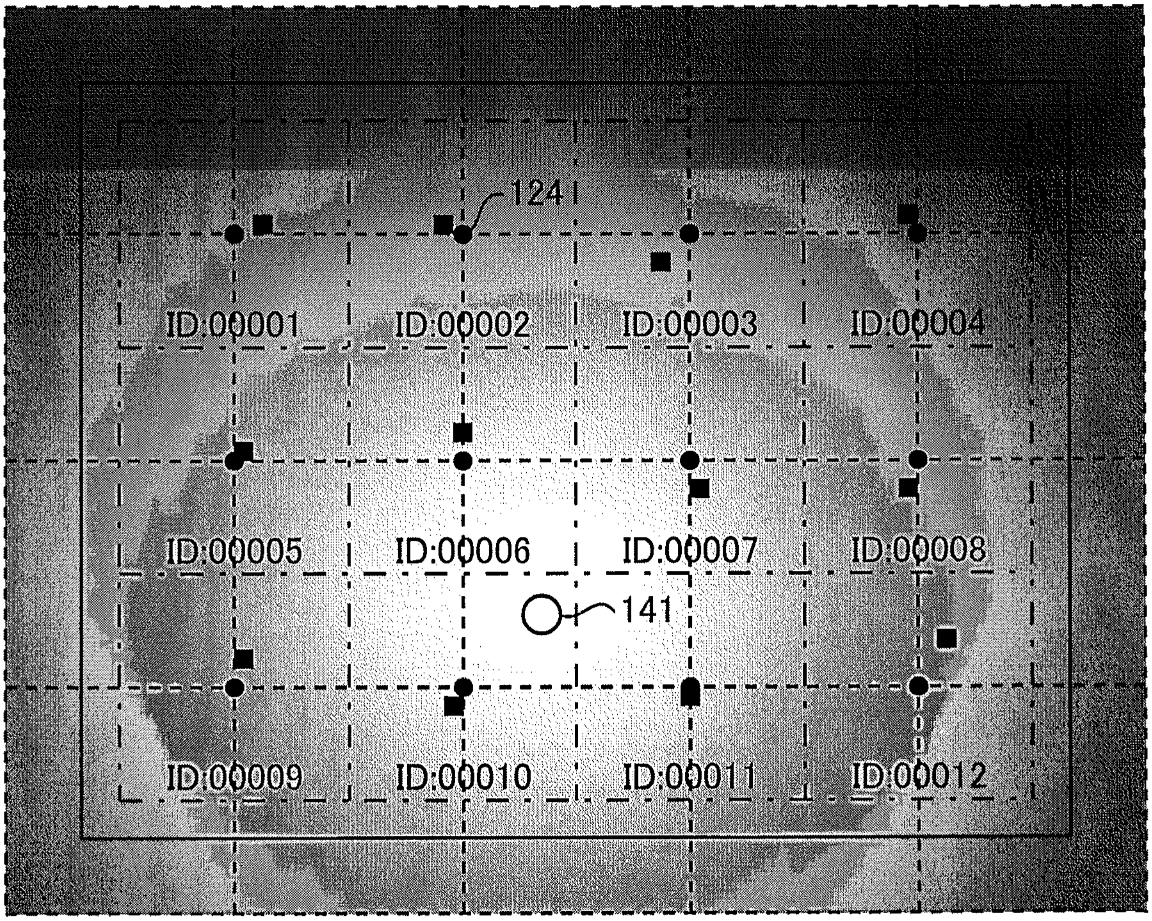
FIG. 7 is a diagram illustrating an example of a plurality of gradation images generated based on a center point of each of a plurality of reachable mesh regions illustrated in FIG. 6.

FIG. 7 is a diagram illustrating an example of a plurality of gradation images generated based on a center point of each of a plurality of the reachable mesh regions 101 to 112 illustrated in FIG. 6.

In the gradation image illustrated in FIG. 7, the vicinity of the departure point 141 is drawn in green, and gradually changes to red as a remaining power amount after movement decreases, that is, as a distance from the departure point 141 increases.

Note that the gradation image generation part 210 may change brightness in a drawing region gradually according to a value of travelable probability of each center point. In this case, a color in the drawing region is a single color, and brightness is changed gradually.

The output part 211 outputs information obtained by superimposing a gradation image generated by the gradation image generation part 210 on a map. The output part 211 outputs information obtained by superimposing a gradation image on a map as travelable range information.

Next, power consumption amount DB generation processing of the server 2 in the first embodiment will be described.

Figure 8:
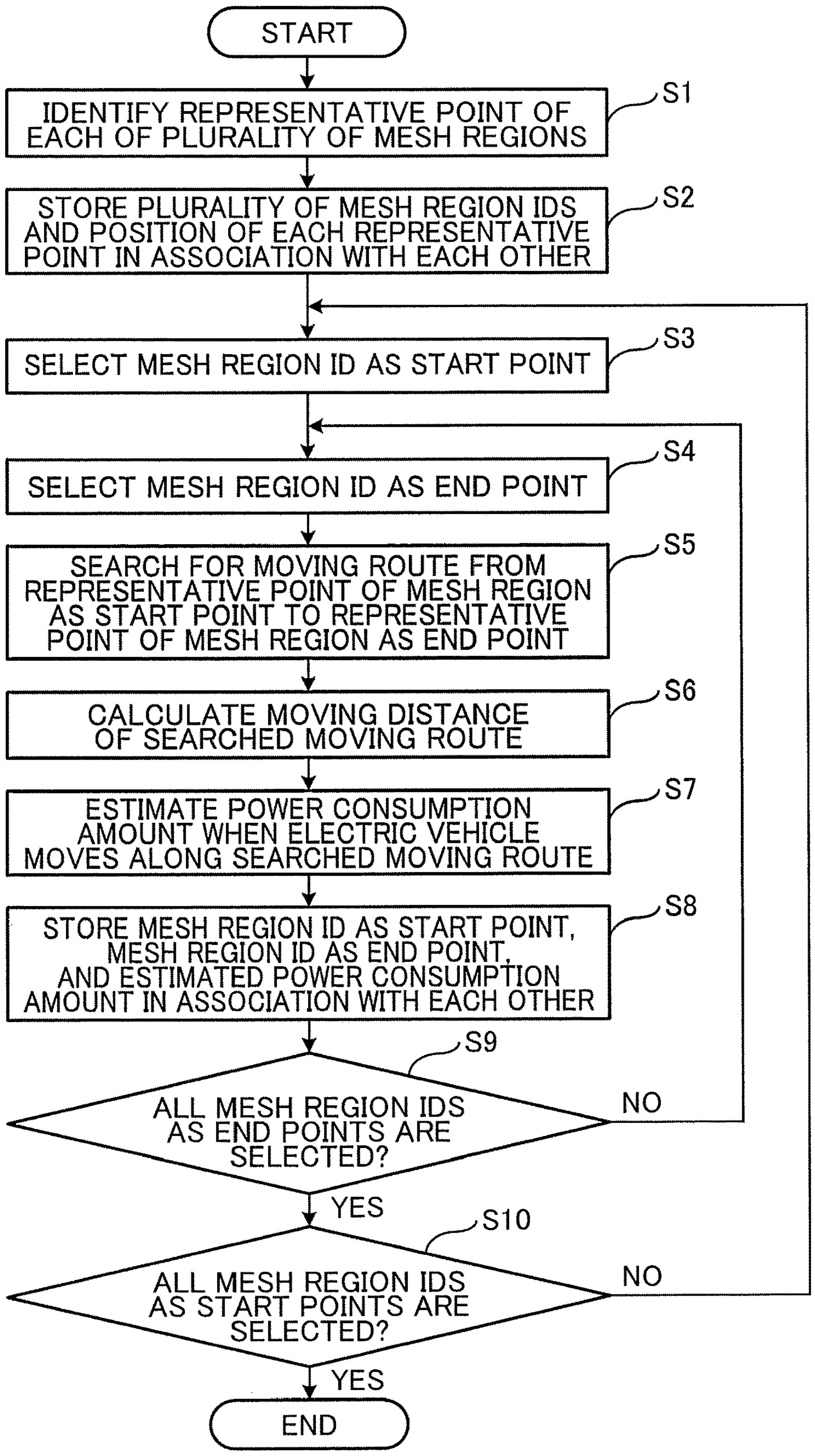
FIG. 8 is a flowchart for describing power consumption amount DB generation processing of a server in the first embodiment.

FIG. 8 is a flowchart for describing the power consumption amount DB generation processing of the server 2 in the first embodiment.

First, in step S1, the power consumption amount DB generation part 204 identifies a representative point of each of a plurality of mesh regions. At this time, the power consumption amount DB generation part 204 determines a position of a node closest to a center point of each of a plurality of mesh regions as a position of a representative point of each of a plurality of mesh regions.

Next, in step S2, the power consumption amount DB generation part 204 stores a plurality of mesh region IDs and a position of each representative point in association with each other in the power consumption amount DB storage part 226.

Next, in step S3, the power consumption amount DB generation part 204 selects a mesh region ID as a start point among a plurality of mesh region IDs.

Next, in step S4, the power consumption amount DB generation part 204 selects a mesh region ID as an end point among a plurality of other mesh region IDs other than the mesh region ID as a start point.

Next, in step S5, the power consumption amount DB generation part 204 searches for a moving route from a representative point of the mesh region as a start point to a representative point of the mesh region as an end point.

Next, in step S6, the power consumption amount DB generation part 204 calculates a moving distance of the searched moving route.

Next, in step S7, the power consumption amount DB generation part 204 inputs the calculated moving distance to a power consumption amount estimation model to estimate a power consumption amount when the electric vehicle 1 moves along the searched moving route.

Next, in step S8, the power consumption amount DB generation part 204 stores the mesh region ID as a start point, the mesh region ID as an end point, and the estimated power consumption amount in association with each other in the power consumption amount DB storage part 226.

Next, in step S9, the power consumption amount DB generation part 204 determines whether or not all mesh region IDs as end points are selected. That is, the power consumption amount DB generation part 204 determines whether or not all of a plurality of other mesh region IDs other than the mesh region ID as a start point are selected as mesh region IDs as end points.

Here, in a case where not all mesh region IDs as end points are determined to be selected (NO in step S9), the processing returns to step S4, and the power consumption amount DB generation part 204 selects a mesh region ID not selected as a mesh region ID as an end point among a plurality of other mesh region IDs other than the mesh region ID as a start point.

On the other hand, in a case where all mesh region IDs as end points are determined to be selected (YES in step S9), in step S10, the power consumption amount DB generation part 204 determines whether or not all mesh region IDs as start points are selected. That is, the power consumption amount DB generation part 204 determines whether or not all of a plurality of mesh region IDs are selected as a mesh region ID as a start point.

Here, in a case where not all mesh region IDs as start points are determined to be selected (NO in step S10), the processing returns to step S3, and the power consumption amount DB generation part 204 selects another mesh region ID that is not selected as a mesh region ID as a start point among a plurality of mesh region IDs.

On the other hand, in a case where all mesh region IDs as start points are determined to be selected (YES in step S10), the power consumption amount DB generation processing ends.

Next, travelable range presentation processing of the server 2 in the first embodiment will be described.

Figure 9:
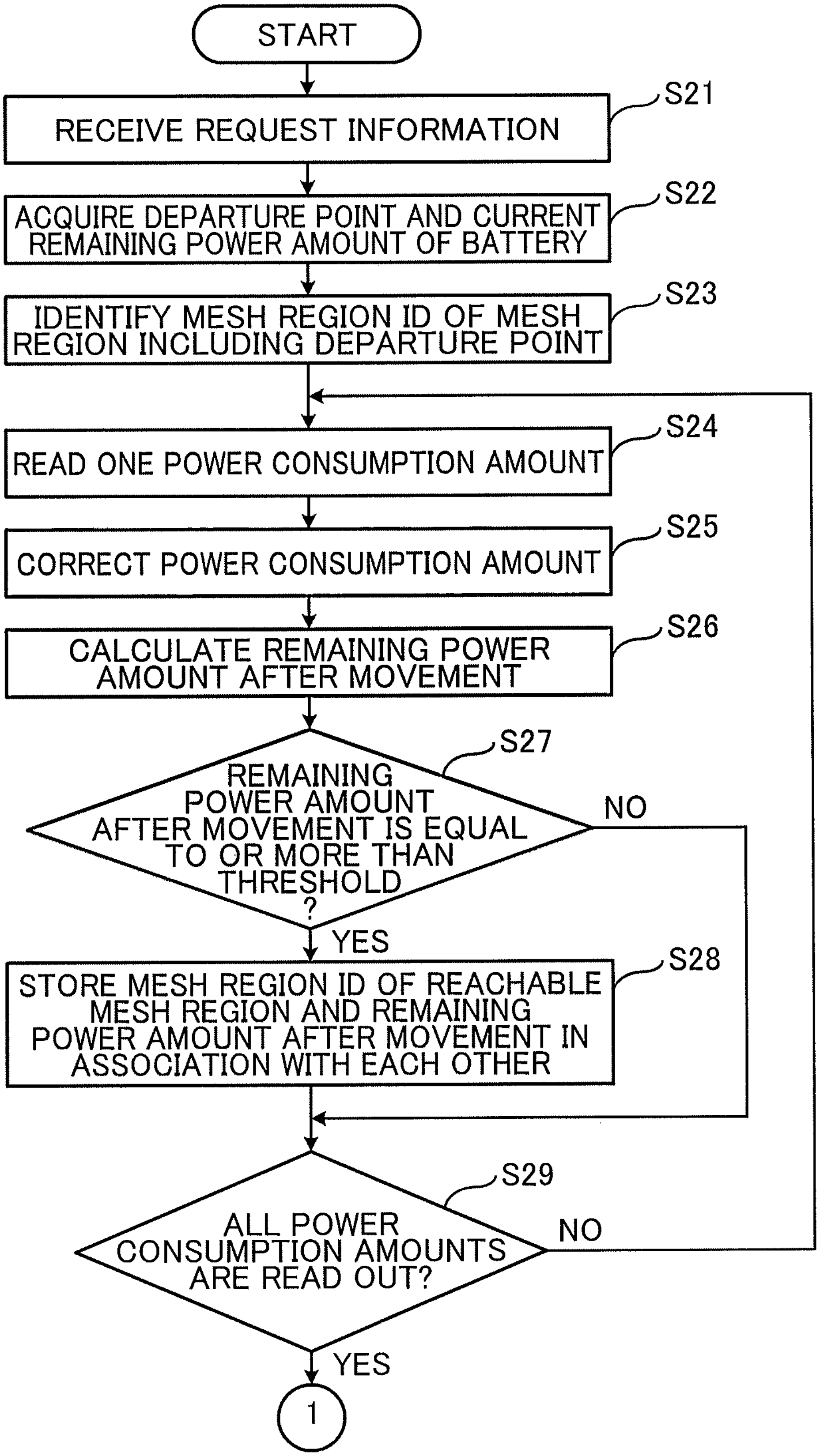
FIG. 9 is a first flowchart for describing travelable range presentation processing of the server in the first embodiment.
Figure 10:
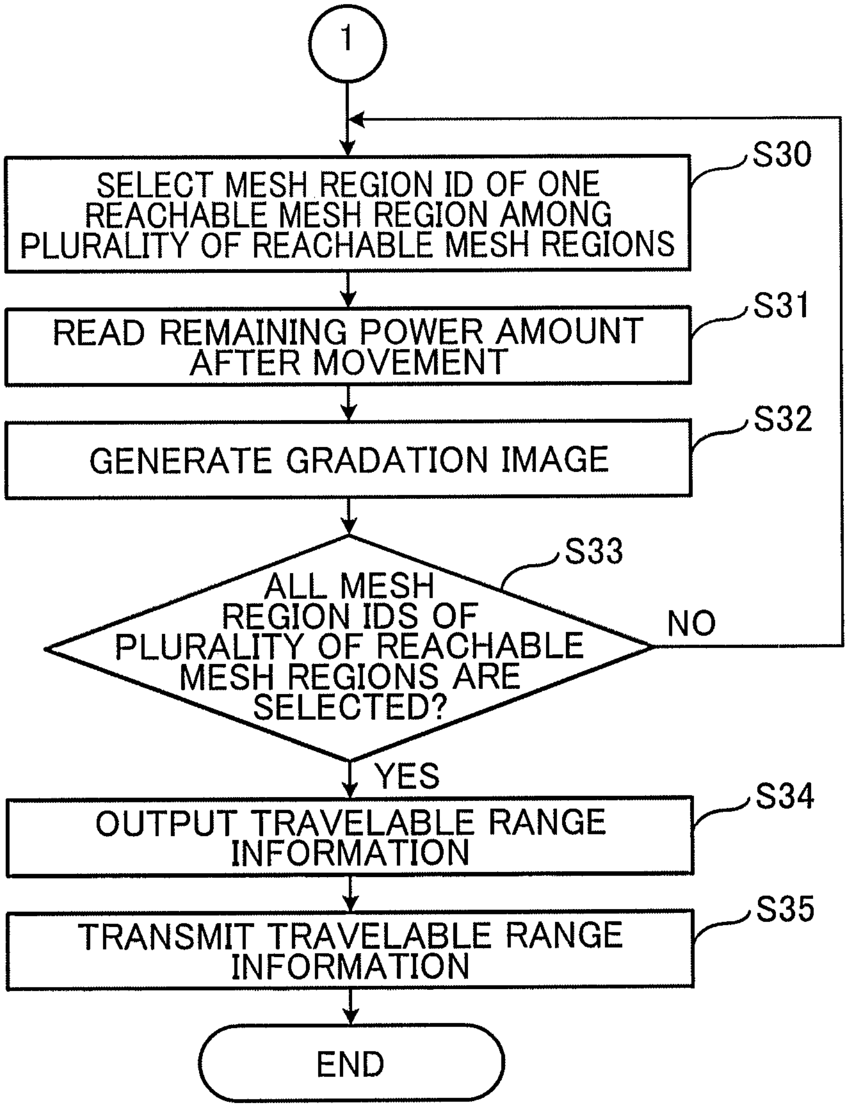
FIG. 10 is a second flowchart for describing the travelable range presentation processing of the server in the first embodiment.

FIG. 9 is a first flowchart for describing the travelable range presentation processing of the server 2 in the first embodiment, and FIG. 10 is a second flowchart for describing the travelable range presentation processing of the server 2 in the first embodiment.

First, in step S21, the communication part 21 receives, from the information terminal 3, request information for requesting travelable range information indicating a travelable range of the electric vehicle 1.

Next, in step S22, the vehicle information acquisition part 205 acquires, from the vehicle information storage part 222, a departure point of the electric vehicle 1 identified by a vehicle ID included in the request information and a current remaining power amount of a battery included in the electric vehicle 1.

Next, in step S23, the power consumption amount estimation part 206 identifies a mesh region ID of a mesh region including the departure point.

Next, in step S24, the power consumption amount estimation part 206 reads, from the power consumption amount DB storage part 226, one power consumption amount from among a plurality of power consumption amounts associated with the mesh region ID of the mesh region including the departure point and mesh region IDs of a plurality of other mesh regions.

Next, in step S25, the power consumption amount correction part 207 corrects the power consumption amount read by the power consumption amount estimation part 206. At this time, the power consumption amount correction part 207 reads, from the correction factor storage part 224, a correction factor corresponding to a moving distance between a representative point of the mesh region including the departure point and a representative point of another mesh region, and multiplies a power consumption amount by the read correction factor so as to correct the power consumption amount.

Next, in step S26, the post-movement remaining power amount calculation part 208 subtracts the power consumption amount corrected by the power consumption amount correction part 207 from a current remaining power amount acquired by the vehicle information acquisition part 205 to calculate a remaining power amount after movement in a case where the electric vehicle 1 moves from the mesh region including the departure point to another mesh region.

Next, in step S27, the reachable mesh region identification part 209 determines whether or not the calculated remaining power amount after movement is equal to or more than a threshold.

Here, in a case where the remaining power amount after movement is determined not to be equal to or more than the threshold (NO in step S27), the processing proceeds to step S29.

On the other hand, in a case where the remaining power amount after movement is determined to be equal to or more than the threshold (YES in step S27), in step S28, the reachable mesh region identification part 209 identifies a mesh region in which the remaining power amount after movement is equal to or more than the threshold as a reachable mesh region, and stores a mesh region ID of the reachable mesh region and the remaining power amount after movement in association with each other in the post-movement remaining power amount storage part 227.

Next, in step S29, the power consumption amount estimation part 206 determines whether or not all power consumption amounts associated with the mesh region ID of the mesh region including the departure point and mesh region IDs of a plurality of other mesh regions are read out.

Here, in a case where not all the power consumption amounts are determined to be read out (NO in step S29), the processing returns to step S24, and the power consumption amount estimation part 206 reads, from the power consumption amount DB storage part 226, another power consumption amount from among a plurality of power consumption amounts associated with the mesh region ID of the mesh region including the departure point and mesh region IDs of a plurality of other mesh regions.

On the other hand, in a case where all power consumption amounts are determined to be read out (YES in step S29), in step S30, the gradation image generation part 210 selects a mesh region ID of one reachable mesh region among a plurality of reachable mesh regions identified by the reachable mesh region identification part 209.

Next, in step S31, the gradation image generation part 210 reads, from the post-movement remaining power amount storage part 227, a remaining power amount after movement associated with the selected mesh region ID of one reachable mesh region and three remaining power amounts after movement associated with three mesh region IDs of three reachable mesh regions around the one reachable mesh region.

More specifically, the gradation image generation part 210 reads, from the post-movement remaining power amount storage part 227, a remaining power amount after movement associated with a mesh region ID of the selected first reachable mesh region among a plurality of reachable mesh regions, a remaining power amount after movement associated with a mesh region ID of the second reachable mesh region on the left side of the first reachable mesh region, a remaining power amount after movement associated with a mesh region ID of the third reachable mesh region on the upper left side of the first reachable mesh region, and a remaining power amount after movement associated with a mesh region ID of the fourth reachable mesh region on the upper side of the first reachable mesh region.

Note that, in a case where there is no reachable mesh region on the right side of the selected first reachable mesh region, the gradation image generation part 210 reads, from the post-movement remaining power amount storage part 227, a remaining power amount after movement associated with a mesh region ID of the selected first reachable mesh region, a remaining power amount after movement associated with a mesh region ID of a mesh region on the right side of the first reachable mesh region, a remaining power amount after movement associated with a mesh region ID of a mesh region on the upper right side of the first reachable mesh region, and a remaining power amount after movement associated with a mesh region ID of a mesh region on the upper side of the first reachable mesh region.

Further, in a case where there is no reachable mesh region on the lower side of the selected first reachable mesh region, the gradation image generation part 210 reads, from the post-movement remaining power amount storage part 227, a remaining power amount after movement associated with a mesh region ID of the selected first reachable mesh region, a remaining power amount after movement associated with a mesh region ID of a mesh region on the left side of the first reachable mesh region, a remaining power amount after movement associated with a mesh region ID of a mesh region on the lower left side of the first reachable mesh region, and a remaining power amount after movement associated with a mesh region ID of a mesh region on the lower side of the first reachable mesh region.

Further, in a case where there is no reachable mesh region on the right side of the selected first reachable mesh region and there is no reachable mesh region on the lower side of the selected first reachable mesh region, the gradation image generation part 210 reads, from the post-movement remaining power amount storage part 227, a remaining power amount after movement associated with a mesh region ID of the selected first reachable mesh region, a remaining power amount after movement associated with a mesh region ID of a mesh region on the right side of the first reachable mesh region, a remaining power amount after movement associated with a mesh region ID of a mesh region on the lower right side of the first reachable mesh region, and a remaining power amount after movement associated with a mesh region ID of a mesh region on the lower side of the first reachable mesh region.

By the above, remaining power amounts after movement of mesh regions on the right side, the lower side, and the lower right side of a plurality of reachable mesh regions can be acquired.

Next, in step S32, the gradation image generation part 210 generates a gradation image in which a color or brightness in a drawing region formed by connecting a center point of the selected one reachable mesh region and three center points of three reachable mesh regions around the one reachable mesh region is changed gradually according to a remaining power amount after movement in the one reachable mesh region and the three reachable mesh regions.

More specifically, the gradation image generation part 210 generates a gradation image in which a color or brightness in a drawing region formed by connecting a center point of the selected first reachable mesh region among a plurality of reachable mesh regions, a center point of a second reachable mesh region on the left side of the first reachable mesh region, a center point of a third reachable mesh region on the upper left side of the first reachable mesh region, and a center point of a fourth reachable mesh region on the upper side of the first reachable mesh region is changed gradually according to a remaining power amount after movement in the first reachable mesh region, the second reachable mesh region, the third reachable mesh region, and the fourth reachable mesh region.

Note that, in a case where there is no reachable mesh region on the right side of the selected first reachable mesh region, the gradation image generation part 210 generates a gradation image in which a color or brightness in a drawing region formed by connecting a center point of the selected first reachable mesh region, a center point of a mesh region on the right side of the first reachable mesh region, a center point of a mesh region on the upper right side of the first reachable mesh region, and a center point of a mesh region on the upper side of the first reachable mesh region is changed gradually according to remaining power amounts after movement of the first reachable mesh region and the three mesh regions.

Further, in a case where there is no reachable mesh region on the lower side of the selected first reachable mesh region, the gradation image generation part 210 generates a gradation image in which a color or brightness in a drawing region formed by connecting a center point of the selected first reachable mesh region, a center point of a mesh region on the left side of the first reachable mesh region, a center point of a mesh region on the lower left side of the first reachable mesh region, and a center point of a mesh region on the lower side of the first reachable mesh region is changed gradually according to remaining power amounts after movement of the first reachable mesh region and the three mesh regions.

Further, in a case where there is no reachable mesh region on the right side of the selected first reachable mesh region and there is no reachable mesh region on the lower side of the selected first reachable mesh region, the gradation image generation part 210 generates a gradation image in which a color or brightness in a drawing region formed by connecting a center point of the selected first reachable mesh region, a center point of a mesh region on the right side of the first reachable mesh region, a center point of a mesh region on the lower right side of the first reachable mesh region, and a center point of a mesh region on the lower side of the first reachable mesh region is changed gradually according to remaining power amounts after movement of the first reachable mesh region and the three mesh regions.

By the above, a gradation image is also generated on the right side, the lower side, and the lower right side of a plurality of reachable mesh regions, so that it is possible to prevent the right side, the lower side, and the lower right side of a gradation image from missing.

Next, in step S33, the gradation image generation part 210 determines whether or not all mesh region IDs of a plurality of reachable mesh regions are selected.

Here, in a case where not all mesh region IDs of a plurality of reachable mesh regions are determined to be selected (NO in step S33), the processing returns to step S30, and the gradation image generation part 210 selects a mesh region ID of another reachable mesh region among a plurality of reachable mesh regions identified by the reachable mesh region identification part 209.

On the other hand, in a case where all mesh region IDs of a plurality of reachable mesh regions are determined to be selected (YES in step S33), in step S34, the output part 211 outputs travelable range information in which the gradation image generated by the gradation image generation part 210 is superimposed on the map to the communication part 21. The gradation image has predetermined transparency. The predetermined transparency is, for example, 50%. By the above, the map below the gradation image can be visually recognized.

Next, in step S35, the communication part 21 transmits the travelable range information to the information terminal 3. The information terminal 3 displays received travelable range information.

Figure 11:
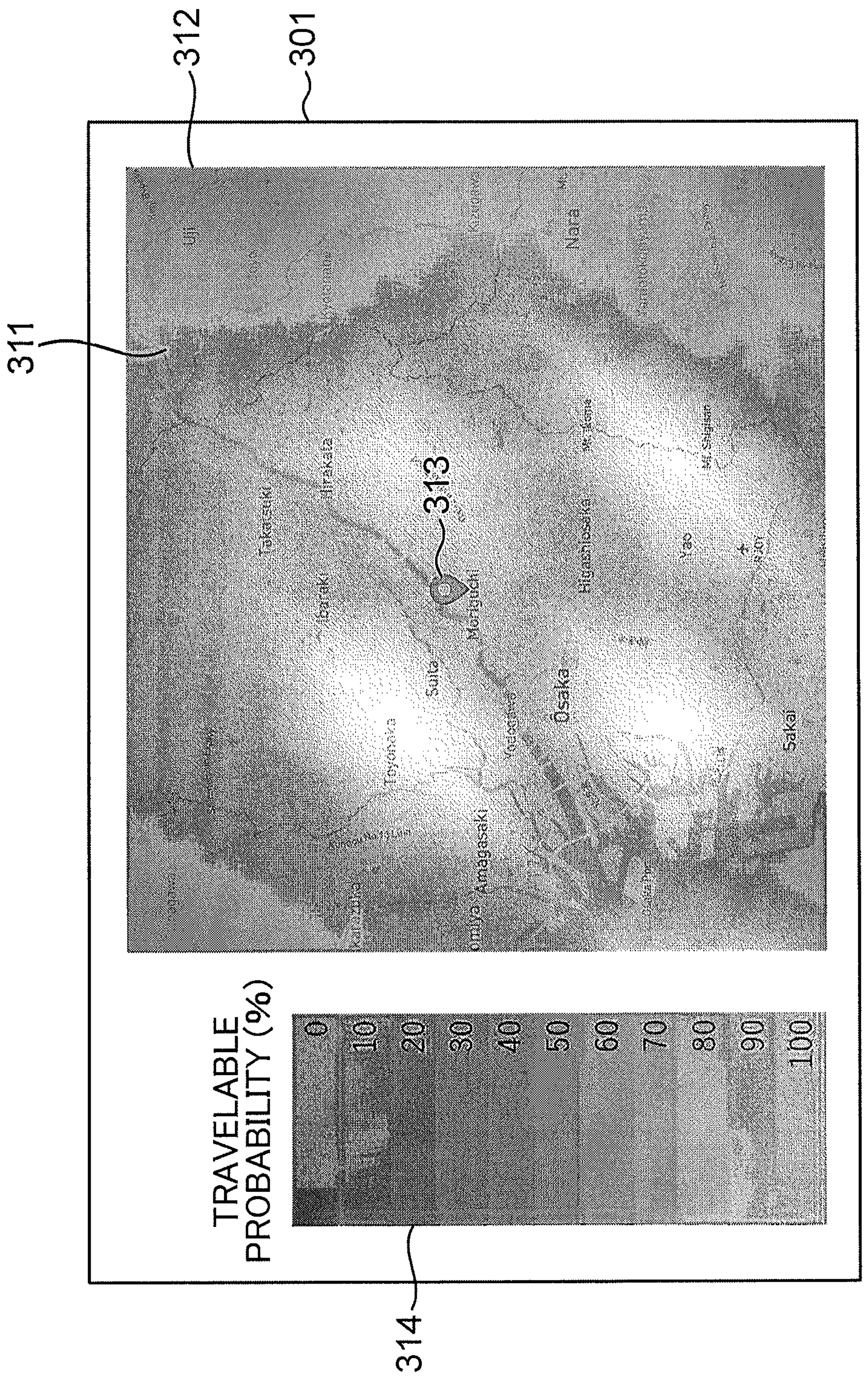
FIG. 11 is a diagram illustrating an example of travelable range information displayed on an information terminal in the first embodiment.

FIG. 11 is a diagram illustrating an example of travelable range information displayed on the information terminal 3 in the first embodiment.

A display part included in the information terminal 3 displays travelable range information 301 illustrated in FIG. 11. The travelable range information 301 includes a map image 311, a gradation image 312 superimposed on the map image 311, a departure point icon 313 indicating a departure point of the electric vehicle 1, and a color bar 314 indicating a correspondence relationship between travelable probability and a color. The gradation image 312 is, for example, semitransparent, and the map image 311 below the gradation image 312 is displayed in a visually recognizable manner. Since a travelable range of the electric vehicle 1 is displayed in gradation, the user can know a more detailed travelable range of the electric vehicle 1 by viewing the travelable range information 301.

As described above, among a plurality of mesh regions, a plurality of mesh regions in which a remaining power amount after movement is equal to or more than a threshold are identified as a plurality of reachable mesh regions. A gradation image in which a color or brightness in a drawing region formed by connecting a center point of one reachable mesh region among a plurality of reachable mesh regions and three center points of three reachable mesh regions around the one reachable mesh region is changed gradually according to a remaining power amount after movement of the one reachable mesh region and the three reachable mesh regions is generated. A gradation image is generated for all of a plurality of reachable mesh regions. Travelable range information obtained by superimposing the generated gradation image on the map is output.

Therefore, a range in which the electric vehicle 1 can travel is represented by gradation in which a color or brightness changes gradually according to a remaining power amount after movement of a battery of the electric vehicle 1, so that a travelable range of the electric vehicle 1 can be displayed in detail.

Second Embodiment

In the first embodiment described above, a power consumption amount between a representative point of a mesh region including a departure point of the electric vehicle 1 and a representative point of another mesh region is estimated. In this case, a distance between the departure point and the representative point is not considered, and a power consumption amount at the time of moving from the departure point to the representative point is not considered. On the other hand, in a second embodiment, a first power consumption amount between a departure representative point around a departure point of the electric vehicle 1 and a representative point of another mesh region is estimated, a second power consumption amount between the departure representative point and the departure point of the electric vehicle 1 is estimated, and a total power consumption amount obtained by combining the first power consumption amount and the second power consumption amount is calculated. By the above, a distance between the departure point and the representative point (departure representative point) is considered, and a power consumption amount at the time of moving from the departure point to the representative point (departure representative point) is considered.

Figure 12:
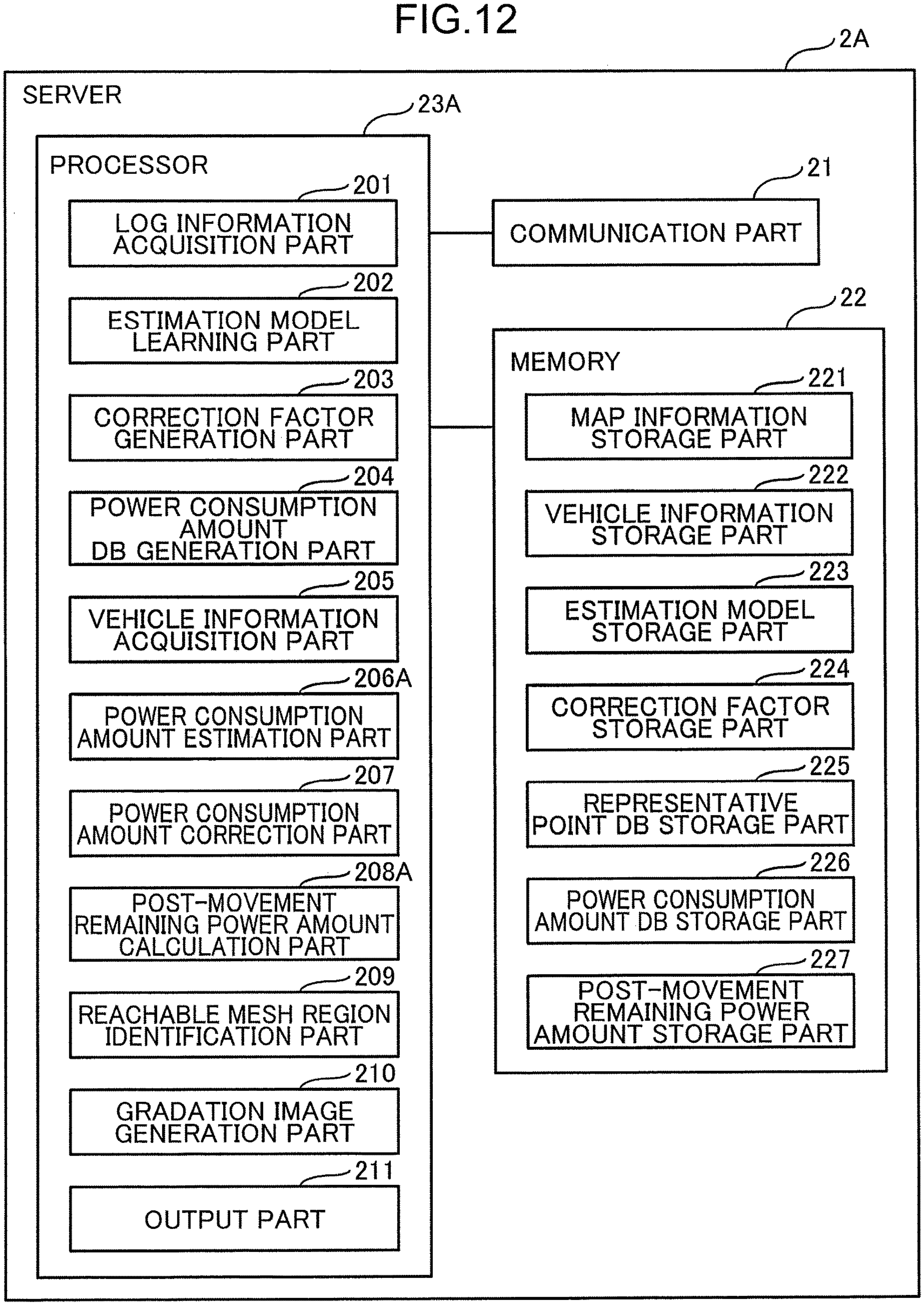
FIG. 12 is a diagram illustrating an example of a configuration of the server in a second embodiment of the present disclosure.

FIG. 12 is a diagram illustrating an example of a configuration of a server 2A in the second embodiment of the present disclosure.

The server 2A illustrated in FIG. 12 includes the communication part 21, the memory 22, and a processor 23A. Note that, in the second embodiment, the same configuration as that in the first embodiment will be denoted by the same reference sign as that in the first embodiment, and will be omitted from description.

The processor 23A is, for example, a CPU. The processor 23A realizes the log information acquisition part 201, the estimation model learning part 202, the correction factor generation part 203, the power consumption amount DB generation part 204, the vehicle information acquisition part 205, a power consumption amount estimation part 206A, the power consumption amount correction part 207, a post-movement remaining power amount calculation part 208A, the reachable mesh region identification part 209, the gradation image generation part 210, and the output part 211.

The power consumption amount estimation part 206A identifies four departure representative points around a departure point among representative points included in each of a plurality of mesh regions. The power consumption amount estimation part 206A divides a plurality of mesh regions into four blocks including each of four departure representative points. The power consumption amount estimation part 206A estimates a first power consumption amount at the time of moving from a departure representative point to a representative point of each of a plurality of mesh regions in the same block for each of a plurality of the mesh regions. The power consumption amount estimation part 206A searches for a moving route from a departure point to a departure representative point. The power consumption amount estimation part 206A estimates a second power consumption amount when the electric vehicle 1 moves on the searched moving route. The power consumption amount estimation part 206A calculates a total power consumption amount obtained by combining the estimated first power consumption amount and the estimated second power consumption amount. The power consumption amount estimation part 206A calculates a total power consumption amount in each of four blocks.

Figure 13:
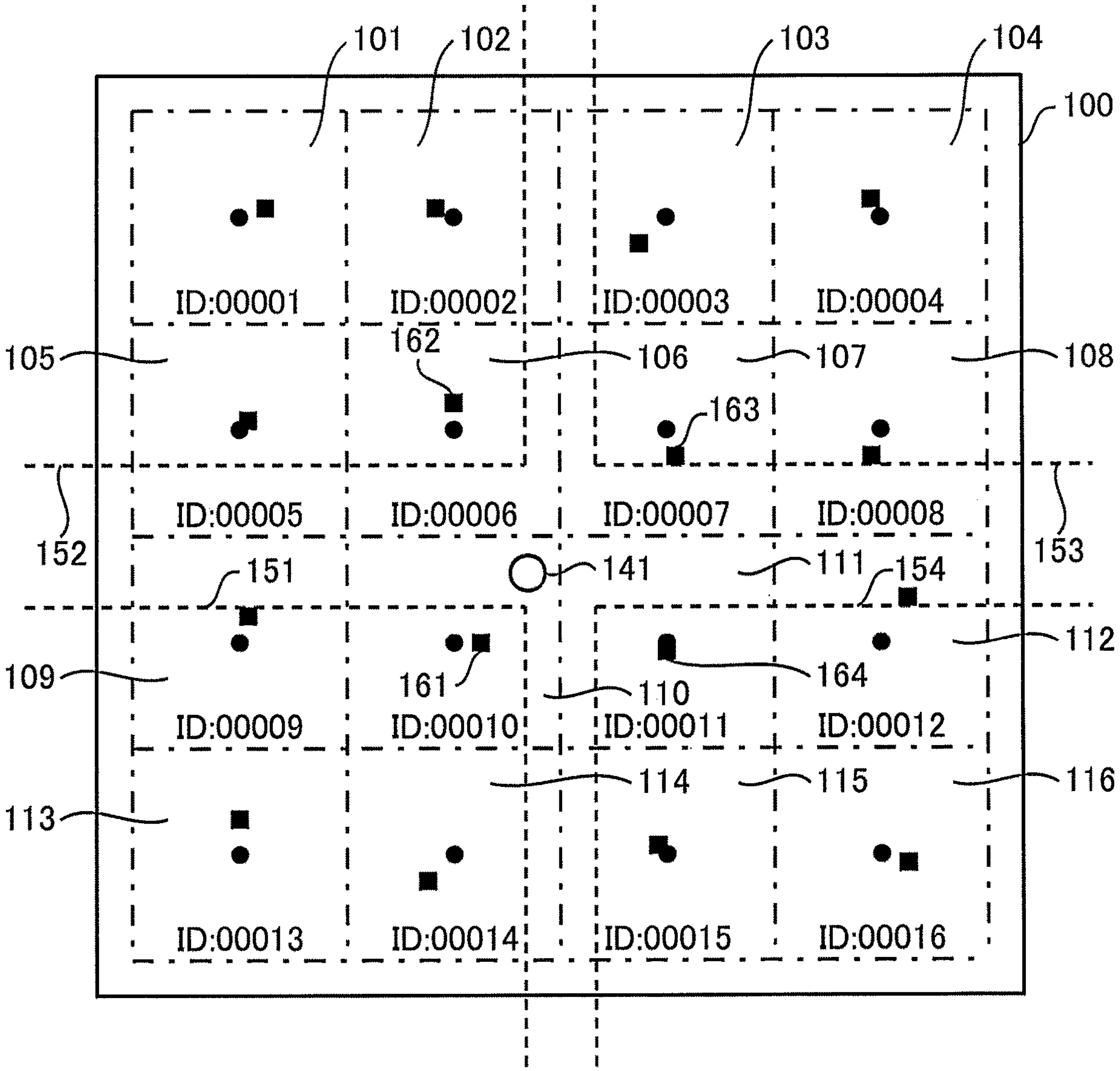
FIG. 13 is a schematic diagram for describing estimation of a power consumption amount by the power consumption amount estimation part in the second embodiment.

FIG. 13 is a schematic diagram for describing estimation of a power consumption amount by the power consumption amount estimation part 206A in the second embodiment. In FIG. 13, a black circle point represents a center point (centroid point) of a mesh region, and a black square point represents a representative point.

The power consumption amount estimation part 206A identifies four departure representative points 161, 162, 163, and 164 around the departure point 141 among representative points included in each of a plurality of mesh regions. At this time, the power consumption amount estimation part 206A identifies four of the departure representative points 161, 162, 163, and 164 in order of proximity to the departure point 141.

Next, the power consumption amount estimation part 206A divides a plurality of the mesh regions 101 to 116 into four blocks 151, 152, 153, and 154 including each of four of the departure representative points 161, 162, 163, and 164. For example, the first block 151 including the departure representative point 161 includes a plurality of the mesh regions 109, 110, 113, and 114. Further, the second block 152 including the departure representative point 162 includes a plurality of the mesh regions 101, 102, 105, and 106. Further, the third block 153 including the departure representative point 163 includes a plurality of the mesh regions 103, 104, 107, and 108. Further, the fourth block 154 including the departure representative point 164 includes a plurality of the mesh regions 111, 112, 115, and 116.

A plurality of the mesh regions 101 to 116 are assigned to the first block 151, the second block 152 on the upper side of the first block 151, the third block 153 on the upper right side of the first block, and the fourth block on the right side of the first block.

Next, the power consumption amount estimation part 206A estimates, for each of a plurality of the mesh regions 109, 113, and 114, the first power consumption amount at the time of moving from the departure representative point 161 of the first block 151 to a representative point of each of a plurality of the mesh regions 109, 113, and 114 in the first block 151.

Next, the power consumption amount estimation part 206A searches for a moving route from the departure point 141 to the departure representative point 161.

Next, the power consumption amount estimation part 206A estimates a second power consumption amount when the electric vehicle 1 moves along the searched moving route. At this time, the power consumption amount estimation part 206A calculates a moving distance of the searched moving route. Then, the power consumption amount estimation part 206A inputs the calculated moving distance of the moving route to a power consumption amount estimation model stored in advance, so as to estimate the second power consumption amount when the electric vehicle 1 moves along the searched moving route.

Next, the power consumption amount estimation part 206A calculates a total power consumption amount obtained by combining the first power consumption amount estimated for each of a plurality of the mesh regions 109, 113, and 114 and the estimated second power consumption amount. That is, the power consumption amount estimation part 206A calculates a total power consumption amount obtained by combining the first power consumption amount at the time of moving from the departure representative point 161 to a representative point in the mesh region 109 and the second power consumption amount at the time of moving from the departure point 141 to the departure representative point 161. Further, the power consumption amount estimation part 206A calculates a total power consumption amount obtained by combining the first power consumption amount at the time of moving from the departure representative point 161 to a representative point in the mesh region 113 and the second power consumption amount at the time of moving from the departure point 141 to the departure representative point 161. Further, the power consumption amount estimation part 206A calculates a total power consumption amount obtained by combining the first power consumption amount at the time of moving from the departure representative point 161 to a representative point in the mesh region 114 and the second power consumption amount at the time of moving from the departure point 141 to the departure representative point 161. The power consumption amount estimation part 206A calculates a total power consumption amount for all mesh regions in the first block 151.

The power consumption amount estimation part 206A also calculates a total power consumption amount in each of the second block 152 to the fourth block 154 other than the first block 151.

The post-movement remaining power amount calculation part 208A calculates, for each of a plurality of mesh regions, a remaining power amount after movement in a case where the electric vehicle 1 moves from a departure point to each of a plurality of mesh regions based on a current remaining power amount acquired by the vehicle information acquisition part 205 and a plurality of total power consumption amounts estimated by the power consumption amount estimation part 206A. Note that the post-movement remaining power amount calculation part 208A calculates, for each of a plurality of mesh regions, a remaining power amount after movement in a case where the electric vehicle 1 moves from a departure point to each of a plurality of mesh regions based on a current remaining power amount acquired by the vehicle information acquisition part 205 and a plurality of total power consumption amounts corrected by the power consumption amount correction part 207.

The post-movement remaining power amount calculation part 208A subtracts a plurality of total power consumption amounts corrected by the power consumption amount correction part 207 from a current remaining power amount acquired by the vehicle information acquisition part 205 to calculate a remaining power amount after movement in a case where the electric vehicle 1 moves from a mesh region including a departure point to another mesh region.

Next, travelable range presentation processing of the server 2A in the second embodiment will be described.

Figure 14:
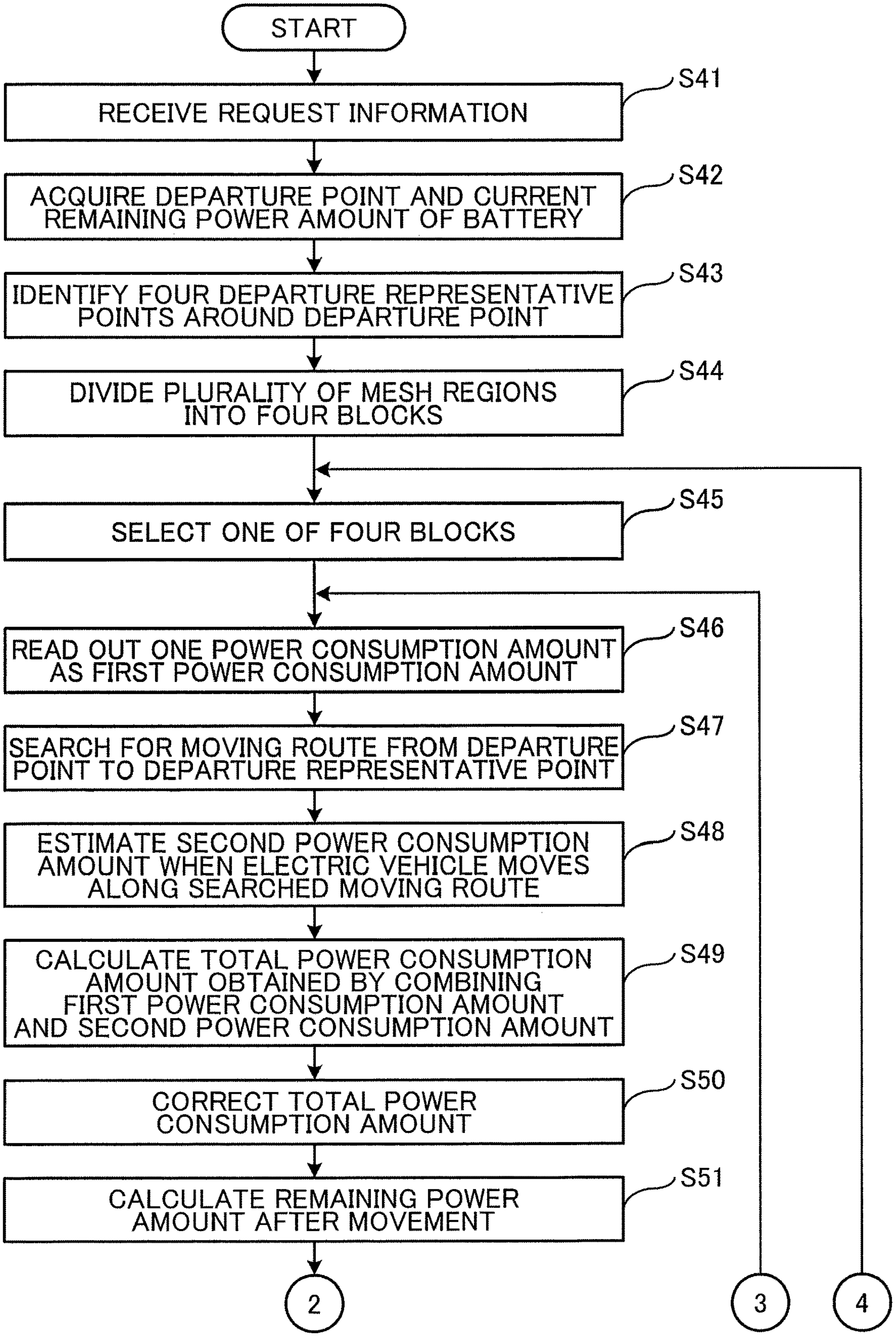
FIG. 14 is a first flowchart for describing the travelable range presentation processing of the server in the second embodiment.
Figure 15:
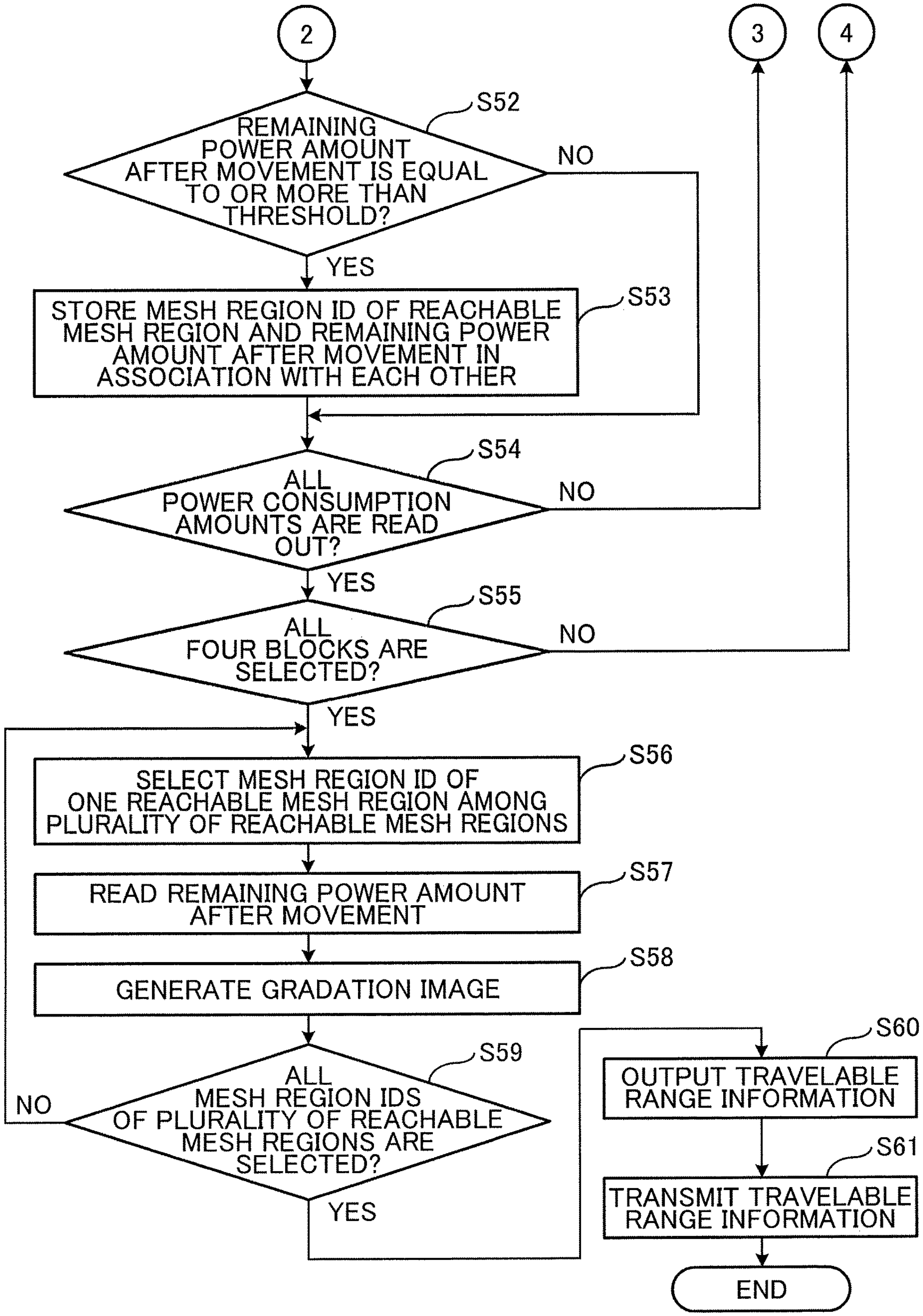
FIG. 15 is a second flowchart for describing the travelable range presentation processing of the server in the second embodiment.

FIG. 14 is a first flowchart for describing the travelable range presentation processing of the server 2A in the second embodiment, and FIG. 15 is a second flowchart for describing the travelable range presentation processing of the server 2A in the second embodiment.

Note that processing in steps S41 to S42 is the same as the processing in steps S21 to S22 in FIG. 9, and thus will be omitted from description.

Next, in step S43, the power consumption amount estimation part 206A identifies four departure representative points around a departure point among representative points included in each of a plurality of mesh regions.

Next, in step S44, the power consumption amount estimation part 206A divides a plurality of mesh regions into four blocks including each of four departure representative points.

Next, in step S45, the power consumption amount estimation part 206A selects one of the four divided blocks.

Next, in step S46, the power consumption amount estimation part 206A reads out, from the power consumption amount DB storage part 226, one power consumption amount as a first power consumption amount, from among a plurality of power consumption amounts associated with a mesh region ID of a mesh region including a departure representative point and mesh region IDs of a plurality of other mesh regions in the same block.

Next, in step S47, the power consumption amount estimation part 206A searches for a moving route from a departure point to a departure representative point.

Next, in step S48, the power consumption amount estimation part 206A estimates a second power consumption amount when the electric vehicle 1 moves along the searched moving route.

Next, in step S49, the power consumption amount estimation part 206A calculates a total power consumption amount obtained by combining the read first power consumption amount and the estimated second power consumption amount.

Next, in step S50, the power consumption amount correction part 207 corrects a total power consumption amount calculated by the power consumption amount estimation part 206A. At this time, the power consumption amount correction part 207 reads out a correction factor corresponding to a moving distance between the departure point and a representative point of another mesh region from the correction factor storage part 224, and multiplies the total power consumption amount by the read correction factor to correct the total power consumption amount.

Next, in step S51, the post-movement remaining power amount calculation part 208A subtracts the total power consumption amount corrected by the power consumption amount correction part 207 from a current remaining power amount acquired by the vehicle information acquisition part 205 to calculate a remaining power amount after movement in a case where the electric vehicle 1 moves from the departure point to another mesh region.

Note that processing in steps S52 to S53 is the same as the processing in steps S27 to S28 in FIG. 9, and thus will be omitted from description.

Next, in step S54, the power consumption amount estimation part 206A determines whether or not all power consumption amounts associated with a mesh region ID of a mesh region including a departure representative point and mesh region IDs of a plurality of other mesh regions are read out.

Here, in a case where not all the power consumption amounts are determined to be read out (NO in step S54), the processing returns to step S46, and the power consumption amount estimation part 206A reads, from the power consumption amount DB storage part 226, another power consumption amount as a first power consumption amount from among a plurality of power consumption amounts associated with the mesh region ID of the mesh region including the departure representative point and mesh region IDs of a plurality of other mesh regions in the same block.

On the other hand, in a case where all the power consumption amounts are determined to be read out (YES in step S54), in step S55, the power consumption amount estimation part 206A determines whether or not all four blocks are selected.

Here, in a case where not all the four blocks are determined to be selected (NO in step S55), the processing returns to step S45, and the power consumption amount estimation part 206A selects another unselected block among four divided blocks.

On the other hand, in a case where all the four blocks are determined to be selected (YES in step S55), in step S56, the gradation image generation part 210 selects a mesh region ID of one reachable mesh region among a plurality of reachable mesh regions identified by the reachable mesh region identification part 209.

Note that processing in steps S56 to S61 is the same as the processing in steps S30 to S35 in FIG. 10, and thus will be omitted from description.

Note that, in each of the above embodiments, each constituent element may be implemented by including dedicated hardware or by executing a software program suitable for each constituent element. Each constituent element may be realized by a program execution unit, such as a CPU or a processor, reading and executing a software program recorded in a recording medium such as a hard disk or a semiconductor memory. Further, a program may be performed by another independent computer system by recording and transferring the program onto a recording medium or transferring the program via a network.

Some or all of the functions of the devices according to the embodiments of the present disclosure are implemented as large scale integration (LSI), which is typically an integrated circuit. These functions may be individually integrated into one chip, or may be integrated into one chip so as to include some or all functions. Further, circuit integration is not limited to LSI, and may be implemented by a dedicated circuit or a general-purpose processor. A field programmable gate array (FPGA), which can be programmed after manufacturing of LSI, or a reconfigurable processor in which connection and setting of circuit cells inside LSI can be reconfigured may be used.

Further, some or all functions of the devices according to the embodiments of the present disclosure may be realized by a processor such as a CPU executing a program.

Further, all numbers used above are illustrated to specifically describe the present disclosure, and the present disclosure is not limited to the illustrated numbers.

Further, order in which steps illustrated in the above flowchart are executed is for specifically describing the present disclosure, and may be any order other than the above order as long as a similar effect is obtained. Further, some of the above steps may be executed simultaneously (in parallel) with other steps.

The technique according to the present disclosure is useful as a technique for presenting a travelable range of an electric moving body because the travelable range of the electric moving body can be displayed in detail.

The invention claimed is:

1. An information processing method by a computer, the information processing method comprising:

acquiring a departure point of an electric moving body and a current remaining power amount of a battery included in the electric moving body;

estimating a power consumption amount in a case where the electric moving body moves from the departure point to each of a plurality of mesh regions obtained by dividing a map;

calculating a remaining power amount after movement in a case where the electric moving body moves from the departure point to each of the plurality of mesh regions based on the current remaining power amount and the power consumption amount;

generating an image in which a color or brightness in a drawing region formed by connecting representative points of four of the mesh regions is changed gradually according to the remaining power amount after movement;

outputting information obtained by superimposing the generated image on a map; and identifying, as a plurality of reachable mesh regions, a plurality of mesh regions in which the remaining power amount after movement is equal to or more than a threshold, wherein in the generating of the image, a gradation image in which a color or brightness in a drawing region formed by connecting center points of four reachable mesh regions among the plurality of reachable mesh regions is changed gradually according to the remaining power amount after movement is generated, and the gradation image is generated for all of the plurality of reachable mesh regions; and in the outputting of information, information obtained by superimposing the generated gradation image on a map is output.

2. The information processing method according to claim 1, wherein in the generating of the image, the gradation image in which the color or brightness in the drawing region formed by connecting a center point of one reachable mesh region among the plurality of reachable mesh regions and three center points of three reachable mesh regions around the one reachable mesh region is changed gradually according to the remaining power amounts after movement in the one reachable mesh region and the three reachable mesh regions is generated.

3. The information processing method according to claim 1, wherein in the estimating of the power consumption amount, the power consumption amount is read out, for each of the plurality of mesh regions, from a power consumption amount storage part that stores in advance a power consumption amount in a case where the electric moving body moves between the plurality of mesh regions.

4. The information processing method according to claim 3, further comprising:

searching for a moving route from a mesh region as a start point to a mesh region as an end point among the plurality of mesh regions;

estimating a power consumption amount when the electric moving body moves between the mesh regions by inputting a moving distance of the searched moving route to a power consumption amount estimation model generated by machine learning with a moving distance as an input value and a power consumption amount as an output value; and storing, in the power consumption amount storage part, the estimated power consumption amount, the mesh region as a start point, and the mesh region as an end point in association with each other.

5. The information processing method according to claim 1, further comprising:

reading out a correction factor associated with a moving distance and moving body identification information for identifying a plurality of electric moving bodies from a correction factor storage part that stores in advance the correction factor; and correcting the power consumption amount by using the read correction factor, wherein the correction factor is a value obtained by dividing a power consumption amount when the electric moving body identified by the moving body identification information moves a predetermined moving distance by an average of power consumption amounts when a plurality of electric moving bodies of a same vehicle type move a same moving distance as the predetermined moving distance.

6. The information processing method according to claim 1, wherein in the estimating of the power consumption amount, the power consumption amount in a case where the electric moving body moves from a representative point included in a mesh region where the departure point is located to a representative point included in each of the plurality of mesh regions is estimated for each of the plurality of mesh regions.

7. The information processing method according to claim 6, wherein the representative point is a node on a map closest to a center point of the mesh region.

8. The information processing method according to claim 1, wherein the drawing region has a rectangular shape, and in the generating of the image, the gradation image in which the color or brightness in the drawing region formed by connecting a center point of a first reachable mesh region among the plurality of reachable mesh regions, a center point of a second reachable mesh region on a left side of the first reachable mesh region, a center point of a third reachable mesh region on an upper left side of the first reachable mesh region, and a center point of a fourth reachable mesh region on an upper side of the first reachable mesh region is changed gradually according to the remaining power amount after movement in the first reachable mesh region, the second reachable mesh region, the third reachable mesh region, and the fourth reachable mesh region is generated.

9. The information processing method according to claim 1, wherein in the estimating of the power consumption amount, four departure representative points around the departure point are identified among representative points included in each of the plurality of mesh regions, the plurality of mesh regions are divided into four blocks including each of the four departure representative points, a first power consumption amount when moving from the departure representative point to a representative point of each of a plurality of mesh regions in a same block is estimated for each of the plurality of mesh regions, a moving route from the departure point to the departure representative point is searched for, a second power consumption amount when the electric moving body moves along the searched moving route is estimated, a total power consumption amount obtained by combining the estimated first power consumption amount and the estimated second power consumption amount is calculated, and the total power consumption amount is calculated in each of the four blocks, and in the calculating of the remaining power amount after movement, the remaining power amount after movement in the case where the electric moving body moves from the departure point to each of the plurality of mesh regions is calculated for each of the plurality of mesh regions based on the acquired current remaining power amount and a plurality of calculated total power consumption amounts.

10. A non-transitory computer readable recording medium storing an information processing program that causes a computer to function to:

acquire a departure point of an electric moving body and a current remaining power amount of a battery included in the electric moving body;

estimate a power consumption amount in a case where the electric moving body moves from the departure point to each of a plurality of mesh regions obtained by dividing a map;

calculate a remaining power amount after movement in a case where the electric moving body moves from the departure point to each of the plurality of mesh regions based on the current remaining power amount and the power consumption amount;

generate an image in which a color or brightness in a drawing region formed by connecting representative points of four of the mesh regions is changed gradually according to the remaining power amount after movement;

output information obtained by superimposing the generated image on a map; and identify, as a plurality of reachable mesh regions, a plurality of mesh regions in which the remaining power amount after movement is equal to or more than a threshold, wherein in the generating of the image, a gradation image in which a color or brightness in a drawing region formed by connecting center points of four reachable mesh regions among the plurality of reachable mesh regions is changed gradually according to the remaining power amount after movement is generated, and the gradation image is generated for all of the plurality of reachable mesh regions; and in the outputting of information, information obtained by superimposing the generated gradation image on a map is output.

11. An information processing device comprising:

a processor; and memory, wherein using the memory, the processor:

acquires a departure point of an electric moving body and a current remaining power amount of a battery included in the electric moving body;

estimates a power consumption amount in a case where the electric moving body moves from the departure point to each of a plurality of mesh regions obtained by dividing a map;

calculates a remaining power amount after movement in a case where the electric moving body moves from the departure point to each of the plurality of mesh regions based on the current remaining power amount and the power consumption amount;

generates an image in which a color or brightness in a drawing region formed by connecting representative points of four of the mesh regions is changed gradually according to the remaining power amount after movement;

outputs information obtained by superimposing the generated image on a map; and identifies, as a plurality of reachable mesh regions, a plurality of mesh regions in which the remaining power amount after movement is equal to or more than a threshold, wherein in the generating of the image, a gradation image in which a color or brightness in a drawing region formed by connecting center points of four reachable mesh regions among the plurality of reachable mesh regions is changed gradually according to the remaining power amount after movement is generated, and the gradation image is generated for all of the plurality of reachable mesh regions; and in the outputting of information, information obtained by superimposing the generated gradation image on a map is output.

* * * * *